(12) United States Patent (10) Patent No.: US 9,114,534 B2
Trompeter (45) Date of Patent: Aug. 25, 2015

(54) ROBOT CALIBRATION SYSTEMS

(71) Applicant: Matthew E Trompeter, Macomb, MI (US)

(72) Inventor: Matthew E Trompeter, Macomb, MI (US)

(*) Notice: Subject to any disclaimer, the term of this patent is extended or adjusted under 35 U.S.C. 154(b) by 56 days.

(21) Appl. No.: 14/098,977

(22) Filed: Dec. 6, 2013

(65) Prior Publication Data

US 2015/0158180 A1 Jun. 11, 2015

Related U.S. Application Data

(63) Continuation-in-part of application No. 13/912,501, filed on Jun. 7, 2013, now abandoned, and a continuation-in-part of application No. PCT/US2013/000146, filed on Jun. 13, 2013.

(60) Provisional application No. 61/849,643, filed on Jan. 31, 2013, provisional application No. 61/848,842, filed on Jan. 14, 2013, provisional application No. 61/849,261, filed on Jan. 23, 2013.

(51) Int. Cl.
G05B 19/04 (2006.01)
B25J 9/16 (2006.01)

(52) U.S. Cl.
CPC ..................... *B25J 9/1692* (2013.01)

(58) Field of Classification Search
CPC ............... B25J 9/1962; G05B 2219/45083; G05B 19/425; G05B 2219/39024; B62D 57/032

USPC ................... 700/245, 248, 252, 254
See application file for complete search history.

(56) References Cited

U.S. PATENT DOCUMENTS

| 5,034,618 | A  | * | 7/1991  | Akeel et al. ............. 250/559.33 |
| 6,044,308 | A  | * | 3/2000  | Huissoon ...................... 700/166 |
| 6,430,472 | B1 | * | 8/2002  | Boillot et al. ................. 700/245 |
| 6,434,449 | B1 | * | 8/2002  | De Smet ....................... 700/254 |
| 8,078,304 | B2 | * | 12/2011 | Rice et al. ..................... 700/112 |
| 2003/0083776 | A1 | * | 5/2003 | Schauer et al. ............... 700/218 |
| 2009/0069936 | A1 | * | 3/2009 | Kock et al. .................... 700/254 |
| 2009/0157226 | A1 | * | 6/2009 | de Smet ....................... 700/254 |
| 2013/0123982 | A1 | * | 5/2013 | Chiu et al. .................... 700/254 |
| 2013/0261876 | A1 | * | 10/2013 | Froom et al. ................ 701/29.3 |
| 2014/0173870 | A1 | * | 6/2014 | Otts ............................ 29/407.1 |

* cited by examiner

*Primary Examiner* — Ian Jen
(74) *Attorney, Agent, or Firm* — Gerald R. Black

(57) ABSTRACT

The robot work finder calibration systems combine a visual datum reference tool with either a manual or automatic tool finder. Two different visual datum reference tools can be used with either an automatic or manual work finder. This technology enables the user to visually see a robotic reference frame, a frame in space that is relative to an industrial robot and workpiece tool that is otherwise abstract. Enabling the user to visually see the robotic reference frame on the shop floor enables adjustment of the robotic frame to the shop floor and correction of a robotic path or off-line program to enhance accuracy. Two laser beams are emitted and intersect at a tool center point. The tool center point and the laser beams are then used to define a robotic reference frame. The technology improves cost and time factors in applications where absolutely accurate robots are not really necessary.

20 Claims, 33 Drawing Sheets

ROBOT CALIBRATION SYSTEMS

CROSS-REFERENCE TO RELATED APPLICATIONS

This application is related to and claims priority to U.S. Provisional Application No. 61/689,643, entitled "VISUAL DATUM REFERENCE TOOL" (Trompeter) filed on Jun. 11, 2012; U.S. Provisional Application No. 61/848,482, entitled "AUTOMATIC ROBOTIC TOOL FINDER", (Trompeter), filed on Jan. 4, 2013; U.S. Provisional Application No. 61/849,261, "AUTOMATIC AND MANUAL ROBOTIC TOOL FINDERS", (Trompeter), filed on Jan. 23, 2013.

This application is also a continuation-in-part of and claims priority to U.S. Ser. No. 13/912,501, entitled "VISUAL DATUM REFERENCE TOOL" (Trompeter), filed on Jun. 6, 2013; and PCT Application No. PCT/US2013/00146, entitled "AUTOMATIC AND MANUAL ROBOT WORK FINDER CALIBRATION SYSTEMS AND METHODS" (Trompeter) filed on Jun. 10, 2013

FIELD OF USE

The present invention relates to an automatic and a manual work finder calibration systems and methods for an industrial robot and, more particularly, to a calibration method for an industrial robot provided with an imaging device of a visual sensor for detecting a working tool and a working position.

BACKGROUND OF THE INVENTION

The sales of industrial robots that has been driven by the automotive industry is now moving into tasks as diverse as cleaning sewers, detecting bombs, and performing intricate surgery. The number of units sold increased to 120,000 units in 2010, twice the number as the previous year, with automotive, metal, and electronics industries driving the growth.

Prior approaches to calibrating robots use measuring devices that either measure the inaccuracies of the robots after the robot is built or devices which measure work piece positions relative to the robots position prior to OLP's.

Some of the prior art includes:

U.S. Pat. No. 7,979,159 (Fixell) discloses an invention which relates to a method and a system for determining the relation between a local coordinate system located in the working range of an industrial robot and a robot coordinate system. The method includes attaching a first calibration object in a fixed relation to the robot and determining the position of the first calibration object in relation to the robot. Then, locating at least three second calibration objects in the working range of the robot, a reference position for each of the second calibration objects in the local coordinate system can be determined by moving the robot until the first calibration object is in mechanical contact with each second calibration object. By reading the position of the robot when the calibration objects are in mechanical contact the relation between the local coordinate system and the robot coordinate system can be calculated.

U.S. Pat. No. 7,945,349 (Svensson, et. al.) discloses an invention which relates to a method and a system for facilitating calibration of a robot cell. One or more objects and an industrial robot perform work in connection to the objects, wherein the robot cell is programmed by means of an off-line programming tool including a graphical component for generating 2D or 3D graphics based on graphical models of the objects. The system comprises a computer unit located at the off-line programming site and configured to store a sequence of calibration points for each of the objects, and to generate a sequence of images including graphical representations of the objects to be calibrated and the calibration points in relation to the objects, and to transfer the images to the robot, and that the robot is configured to display said sequence of images to a robot operator during calibration of the robot cell so that for each calibration point a view including the present calibration point and the object to be calibrated is displayed to the robot operator.

U.S. Pat. No. 7,756,608 (Brogardh) discloses a method for calibration of an industrial robot including a plurality of movable links and a plurality of actuators effecting movement of the links and thereby the robot. The method includes mounting a measuring tip on or in the vicinity of the robot, moving the robot such that the measuring tip is in contact with a plurality of measuring points on the surface of at least one geometrical structure on or in the vicinity of the robot, reading and storing the positions of the actuators for each measuring point, and estimating a plurality of kinematic parameters for the robot based on a geometrical model of the geometrical structure, a kinematic model of the robot, and the stored positions of the actuators for the measuring points.

What is needed are automatic and manual robotic tool finder systems and methods to improve cost and time factors in applications where absolutely accurate robots are not really necessary; examples including body-in-white (BIW) applications, resistance welding, material handling, and MIG welding.

What is needed are automatic and manual robotic tool finder systems and methods for using different robot tools on a shop floor without having to perform a recalibration for each tool.

The primary objective of the automatic and manual robotic tool finder systems and methods of the present invention is to provide a calibration method which is simpler to operate, results in improved precision, involves a lower investment cost, and entails lower operating costs.

Another objective of the automatic and manual robotic tool finder systems and methods of the present invention is to increase the accuracy of the off-line program and decrease robot teaching time, while also negating the need for the technician to "jog" the robot into position as the process is automated.

SUMMARY OF THE INVENTION

The automatic and manual robotic tool calibration systems and methods of the present invention address these needs and objectives.

The automatic and manual robotic tool calibration system of the present invention is a robot calibration system.

The robot calibration system comprises means for emitting a pair of lasers beams. The emitting means require that the lasers are preferably mounted so that the laser beams intersect at essentially a 90° angle relative to each other at a tool center point. The pair of laser beams defines the tool center point and the location of a robotic reference frame.

The geometry of the emitting means is a visual datum reference tool and is preferably basic and the lasers are mounted in an L-shaped or C-shaped member. The angular positions of the robot tool are adjustable relative to the robotic reference frame.

The visual datum reference tool includes two (2) laser positioned onto a work piece or tool, at a known location (a numerical control block or NAAMS mounting pattern) with the two laser beams intersecting at essentially at a ninety degree)(90° angle and continuing to project outward. The tool center point (TCP) of the robot defines the correct location of the robotic reference frame. To accomplish this, the robot TCP records a first point at the intersection of the two (2) laser beams. A second point is then recorded along the axis of the first laser beam. A third point is then recorded along the axis of the second laser beam. Once all three (3) points are known, the robotic reference frame is generated. The robotic reference frame is then used to adjust the angular position of the robot tool, which can involve adjusting roll, pitch and/or yaw of said robot tool. This method is applicable for all robotic processes, including but not limited to, spot welders, material handlers, and MIG welders, assembly, cutting, painting and coating, and polishing and finishing.

The adjusting means is a robotic tool finder that is either a manual robotic tool finder or an automatic robotic tool finder. The adjusting means includes means for retaining the manual robotic tool finder onto a robot tool. The adjusting means enables adjustment of the angular positions of the robot tool relative to the robotic reference frame. The adjusting means enables generation of the robotic reference frame.

The manual tool finder, in use, enables user alignment of the robot work path by moving the robot into until either the first or second laser is visible unobstructed through a first or second passageway. The first passageway enables a first laser beam to pass through unobstructed and the second passageway enables a second laser beam to pass through unobstructed. The second passageway intersects the first passageway. The manual tool finder includes a closed position and an open position. The open position enables access to the first and the second passageways. The manual robotic tool finder, in use, moves the robot tool until the first or second laser of the visual datum reference tool is unobstructed either through the first passageway or through the second passageway enabling alignment of the robot work path.

The automatic tool finder mounting comprises means for retaining the calibration device onto a robot tool and a plurality of LEDs mounted in close prose proximity to each other. Each of the LEDs is illuminated when struck by one of the laser beams. The automatic tool finder, in use, when attached to the robot tool, automatically programs a robot work path when the LEDs contact either the first or the second laser beam.

This technology enables the user to visually see a robotic reference frame, a frame in space that is relative to an industrial robot and workpiece tool that is otherwise abstract and cannot be seen. Enabling the user to visually see the robotic reference frame on the shop floor will enable the user to adjust the robotic frame to the shop floor environment and, thereby, correct a robotic path or off-line program (OLP) to obtain accuracy.

An alternate embodiment of the visual datum reference tool is a actually a modification of the "Robotic Work Object Cell Calibration System" by the same inventor (Matthew E. Trompeter) and is fully described in U.S. patent application Ser. No. 13/563,903; filed on Aug. 1, 2012. An "E-shaped" structure is preferably disposed horizontally and is positioned at the center of a frame comprising a vertical frame member crossing a horizontal frame member. Two crossing laser beams are emitted from lasers mounted in the "E-shaped" structure. The modification is quite minor in that the leg of the "E-shaped structure" opposing to where a second laser is mounted now includes an opening, enabling said laser beam to pass through unobstructed by said leg of said visual datum reference tool. The visual datum reference tool also includes four plane-projected lasers, one mounted at each frame member end. The laser planes can also be used to adjust for yaw, pitch, and roll of the robot tool.

The preferred embodiment of the manual robotic tool finder device of the present invention is used in conjunction with the "Robotic Work Object Cell Calibration Device, System, and Method" as described in PCT/US2012/000140 (Trompeter) filed on Mar. 14, 2012, or the "Visual Datum Reference Tool" as described in U.S. Provisional Application No. 61/689,643 (Trompeter) filed on Jun. 11, 2012. The manual robotic tool finder device is preferably placed over the weld tips of a weld gun. The manual automatic robot work finder device of the present invention includes two intersecting passageways. The passageways are manually aligned with either the lasers emitted from either the robotic work object cell calibration device or with the visual datum reference tool. The manual automatic robot work finder device of the present invention is placed over the tool center point of either the robotic work object cell calibration device or the visual datum reference tool, the manual robotic tool finder device calibrating the robot work path.

For a complete understanding of the automatic and manual robotic tool finder systems and methods of the present invention, reference is made to the following summary of the invention detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention.

DETAILED DESCRIPTION OF THE PREFERRED EMBODIMENTS

The robotic calibration system of the present invention combines a visual datum reference tool with either a manual or automatic tool finder. FIGS. 1 through 8, and FIG. 26 depict three different preferred embodiments of the visual datum reference tools used in the robot calibration system of the present invention.

Figures 1A, 1B:
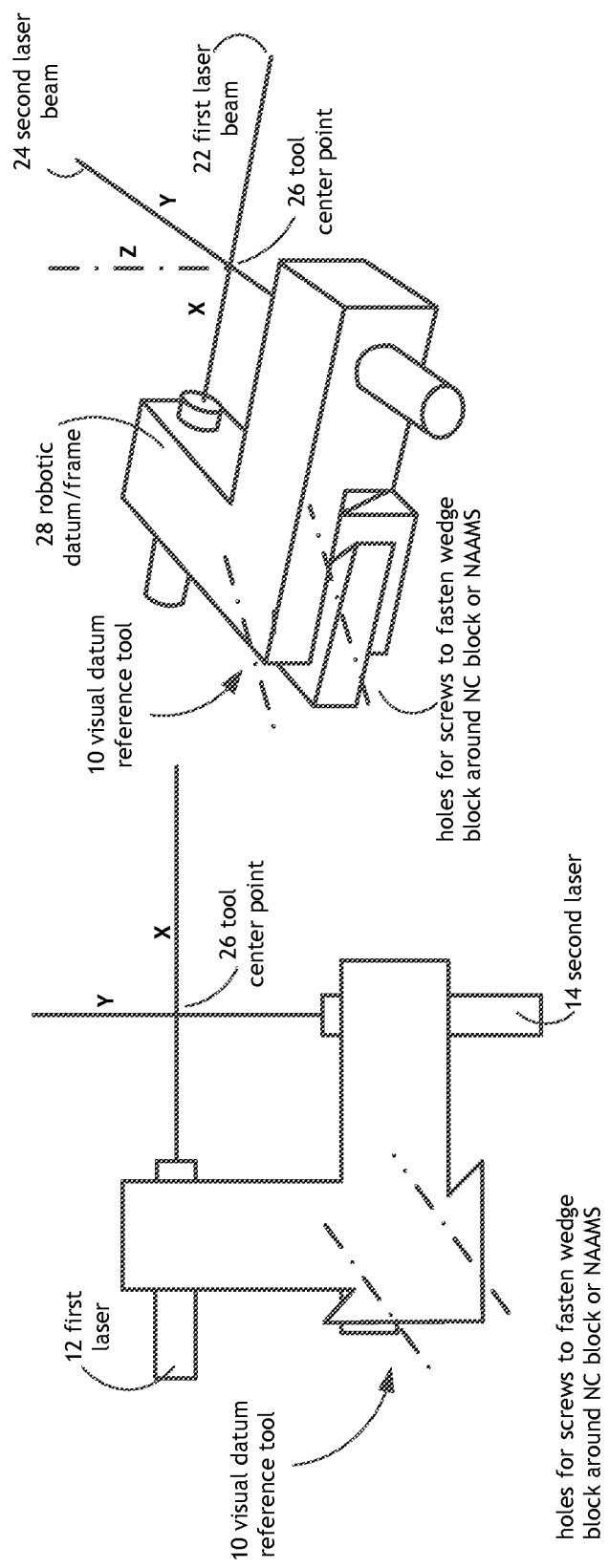
FIG. 1A depicts a first perspective view of a first preferred embodiment of the visual datum reference tool for use with the robot calibration system and method of the present invention, the visual datum reference tool having two beam-projecting lasers being used for aligning the tool center point with a calibration device.
FIG. 1B depicts a second perspective view of the preferred embodiment of the visual datum reference tool of FIG. 1A.
Figure 1C:
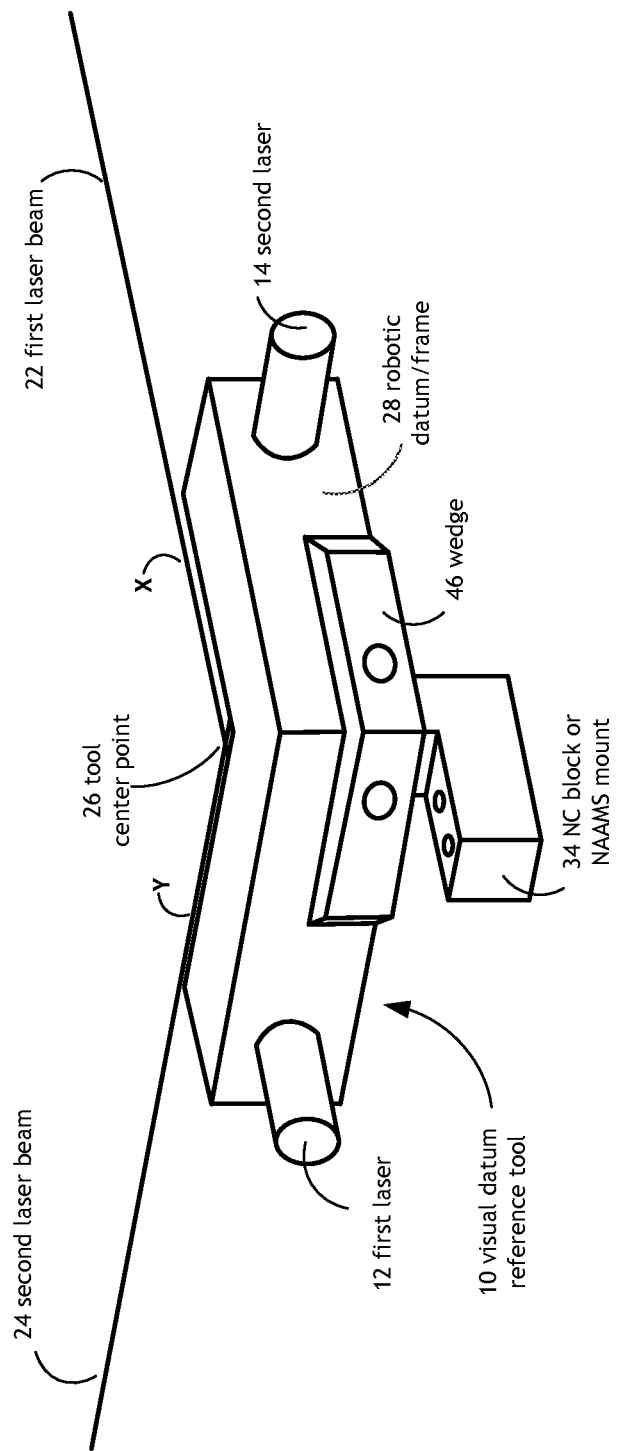
FIG. 1C depicts a third perspective view of the preferred embodiment of the visual datum reference tool of FIG. 1A mounted on an NC block or a NAAMS mounting.
Figure 2:
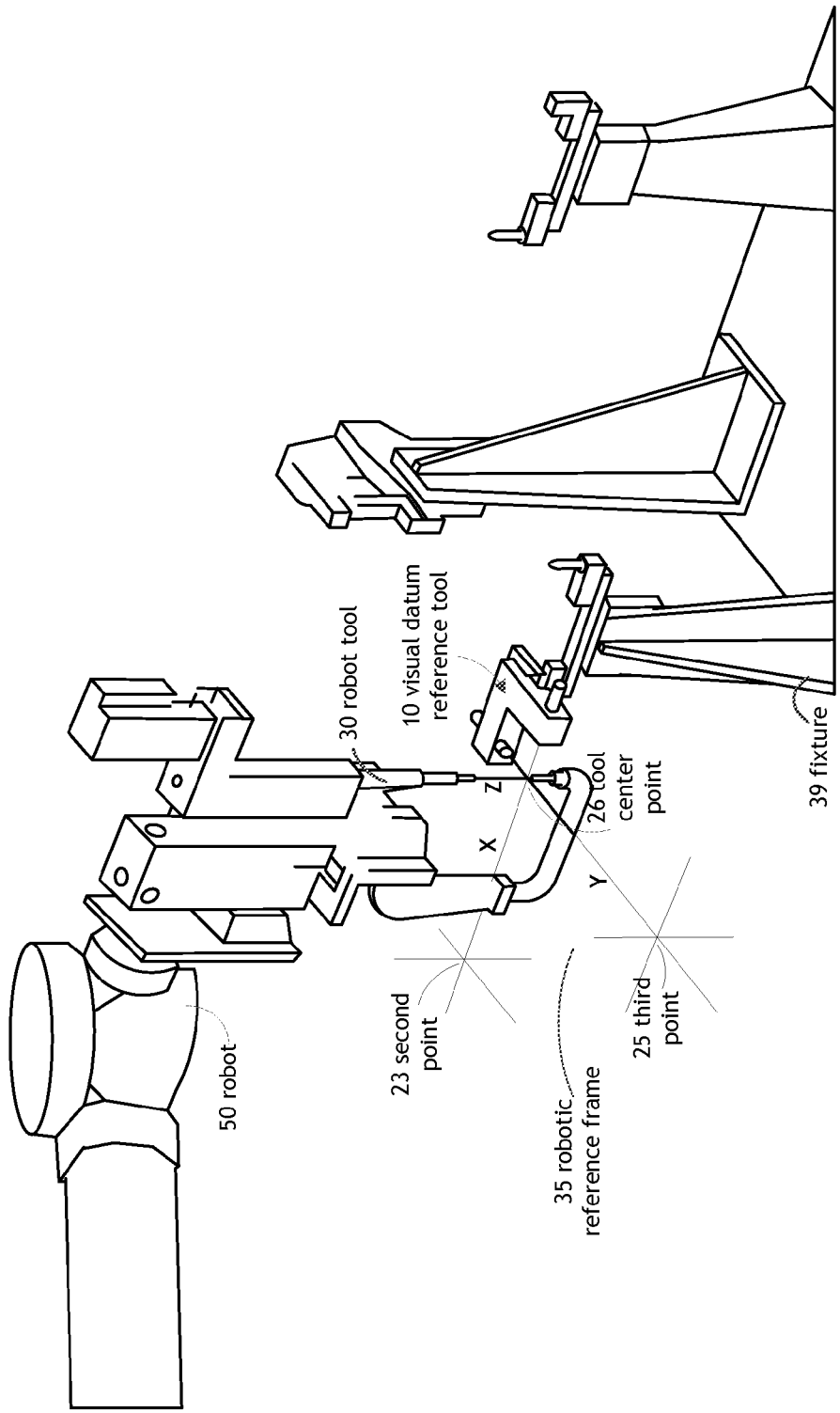
FIG. 2 depicts a perspective view of the visual datum reference tool of FIGS. 1A, 1B, and 1C positioned on a fixture, with a robot being aligned to the tool center point of the visual datum reference tool.
Figure 3:
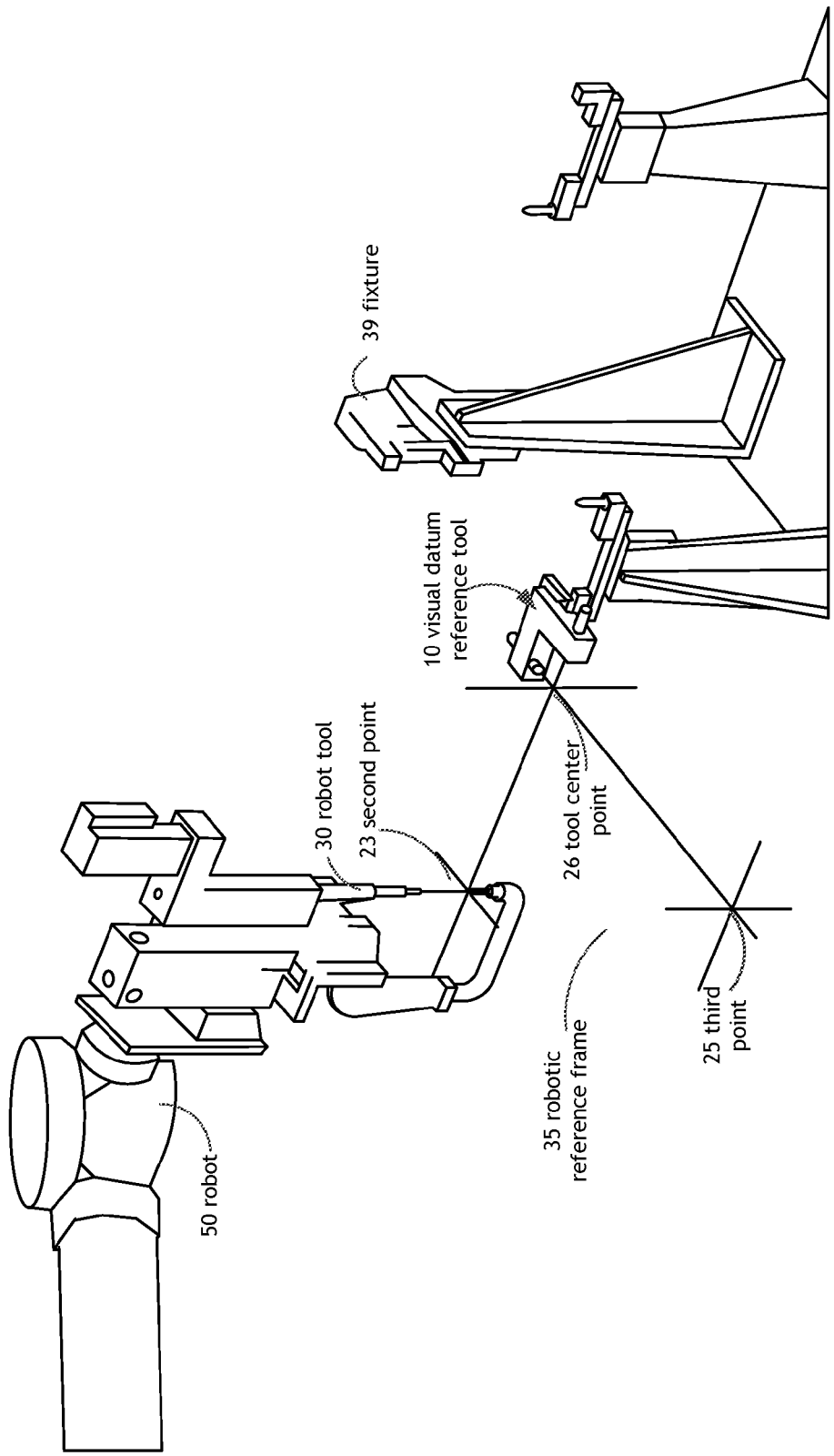
FIG. 3 depicts a perspective view of the visual datum reference tool of FIGS. 1A, 1B, and 1C positioned on the fixture as shown in FIG. 2, with the robot being aligned to the tool center point along the x-axis of the first laser beam projected from the visual datum reference tool.
Figure 4:
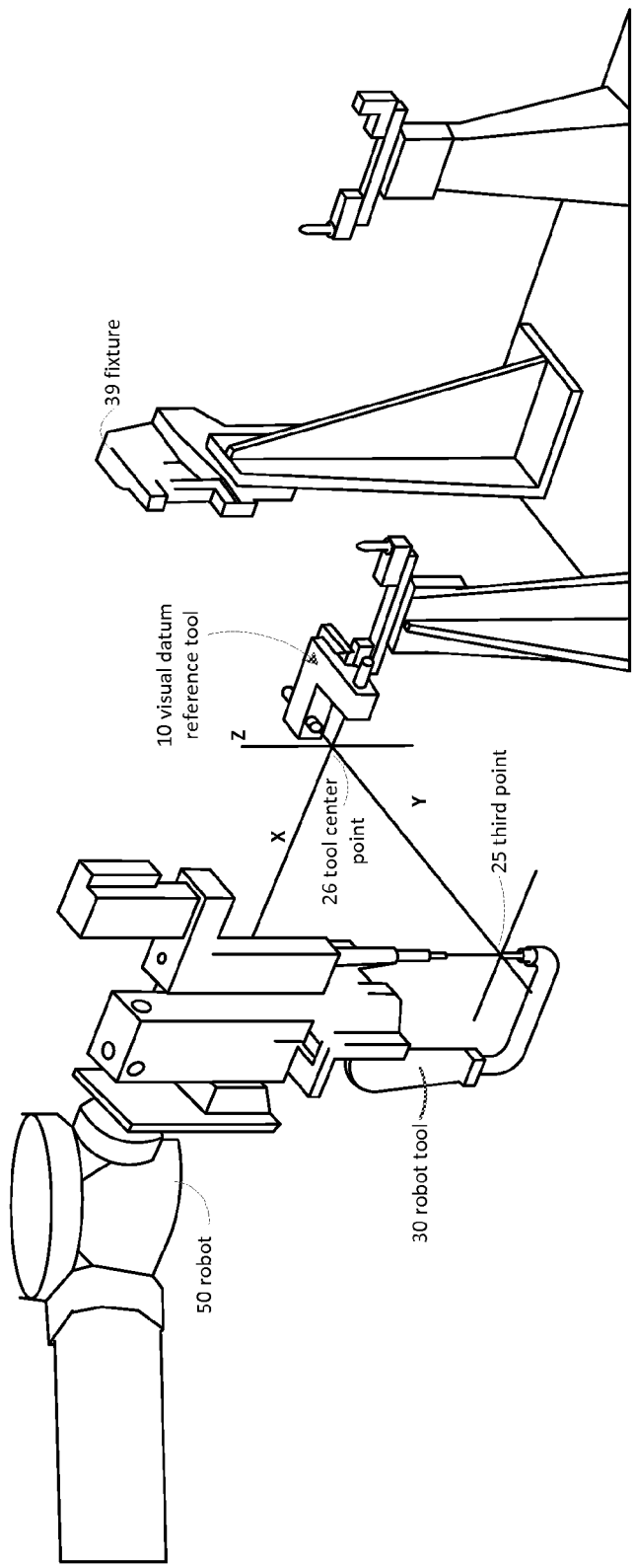
FIG. 4 depicts a perspective view of the visual datum reference tool of FIGS. 1A, 1B, and 1C positioned on the fixture as shown FIG. 2, with the robot being aligned to the tool center point along the y-axis of the second laser beam projected from the visual datum reference tool.

Referring now to the drawings, FIGS. 1A, 1B, and 1C depict the first preferred embodiment of the visual datum reference tool [10]. The visual datum reference tool [10] preferably has two lasers [12 and 14] securely mounted therein, each laser emitting a laser beam [22 and 24, respectively] therefrom. The lasers are preferably mounted in the robotic datum/frame [28] of the visual datum reference tool [10] so that the laser beams [22 and 24] intersect each other at essentially right angles relative to each other. The two laser beams [22 and 24] are used for aligning the tool center point [26] with a calibration device on a robot tool [20].

The technology enables the user to visually see a robotic reference frame [35] (a frame in space that is relative to an industrial robot) that is otherwise abstract and cannot be seen. Enabling the user to visually see the robotic reference frame [35] on the shop floor enables the user to adjust the robotic reference frame [35] to the shop floor environment and, thereby, correct a robotic path or off-line program (OLP) to obtain accuracy.

The visual datum reference tool [10] includes two (2) laser beams positioned onto a work piece or tool, at a known location with the two laser beams [22 and 24] intersecting at essentially a 90° angle and continuing to project outward. The mounting is preferably a numerical control block [46] or a NAAMS mounting pattern [47]. The tool center point [26] of the robot defines the correct location of the robotic reference frame [35]. To accomplish this, the robot will record a first point [26] at the intersection of the two (2) laser beams (see FIG. 2) or tool center point [26]. A second point [23] is then selected along the axis of the first laser beam [22] at a robotic path tag [75] (see FIG. 3). A third point [25] is then selected along the axis of the second laser beam [24] at another robot path tag [75] (see FIG. 4).

In other words, the robotic reference frame [35] is defined by the two intersecting laser beams [22 and 24]. Once all three (3) points [22, 24, and 26] are known, the robotic reference frame [35] is generated. The robotic reference frame is then used to adjust the angular position of the robot tool [20], which can involve adjusting either roll and yaw; roll and pitch; yaw and pitch; or roll, yaw, and pitch of said robot tool [20]. This method is applicable to all robotic processes, including but not limited to, spot welders, material handlers, and MIG welders, assembly, cutting, painting and coating, and polishing and finishing.

Using CAD simulation software, the user selects a position on the tool that is best suited to avoid crashes with other tooling and for ease of access for the robot or end-of-arm tooling. The off-line programs are then downloaded relative to the visual datum reference tool [10]. The visual datum reference tool [10] is then placed onto the robot tool [30] or work piece in the position that is defined by the CAD user on the shop floor. The robot technician then manipulates the tool center point [26] of the robot tool [30] into the device and aligns it to the laser beams [22 and 24] to obtain the difference between the CAD world and shop floor. This difference is then entered into the robot [50] and used to define the new visual datum reference tool center point [26]. This calibrates the off-line programs and defines the distance and orientation of the robot tool [30], fixture [39], and peripheral.

The off-line programming with the visual datum reference tool [10] on the fixture [39] enables the visual datum reference tool [10] to be touched up to the "real world position" of the fixture [39] relative to the robot. If the fixture [39] ever needs to be moved or is accidently bumped, simply touch up the visual datum reference tool [10] and the entire path shifts to accommodate.

The first and second laser beams [22 and 24] are projected onto known features of the robot tool [30], and then used to calibrate the path of the robot tool [20] and measure the relationship of the fixture [39] relative to the robot tool [30].

The CAD user initially selects a position best suited on a tool or work piece to avoid crashes with other tooling and for ease of access for the robot or end-of-arm tooling. The visual datum reference tool [10] preferably mounts onto a fixture [39] using a standard NAAMS hole pattern mount [47]. The mounts are preferably laser cut to ensure the exact matching of hole sizes for the mounting of parts.

The visual datum reference tool [10] has a zero point, a zero reference frame, and a zero theoretical frame in space, which is positioned on the fixture [39].

The visual datum reference tool [10] is placed onto the fixture [39], visually enabling the tool center point [26] of the weld gun to be orientated into the visual datum reference tool [10] obtaining the "real-world" relationship of the robot tool [30] to the fixture [39] while updating the visual datum reference tool [10] to this "real-world" position.

The visual datum reference tool [10] requires that the position of the visual datum reference tool [10] correlate with the position of the robot tool [30] to calibrate the path of the robot tool [30] while acquiring the "real-world" distance and orientation of the fixture [39] relative to the robot tool [30].

The visual datum reference tool [10] calibration method positions the robot tool [30] with the calibration device and determines the difference.

The visual datum reference tool [10] is used to calibrate a "known" calibration device or frame (robotic simulation CAD software provided calibration device). The robotic calibration method of the present invention works by projecting laser beams to a known X, Y, and Z position and defining known geometric planes used to adjust the roll, yaw, and pitch of the robot tool [30] relative to the tool center point [26].

The laser is projected onto the robotic end of the robot arm tooling (weld guns, material handlers, MIG torches, etc.) where the user will manipulate the robot with end-of-arm tooling into these lasers to obtain the positional difference between the "known" off-line program (simulation provided calibration device) and the actual (shop floor) calibration device. The reverse is also true—for instance; a material handler robot can carry the visual datum reference tool [10] to a known work piece with known features.

The CAD model of the visual datum reference tool [10] is placed in the robotic simulation CAD world. The CAD user selects a position best suited on a tool or work piece to avoid crashes with other tooling and for ease of access for the robot or end-of-arm tooling. The off-line programs are then downloaded relative to this visual datum reference tool [10]. The visual datum reference tool [10] will be placed onto the tool or work piece in the position that was defined by the CAD user on the shop floor. The robot technician then manipulates the tool center point [26] into the device, aligning it to the laser beams to obtain the difference between the CAD world and shop floor. This difference is then entered into the robot and used to define the new calibration device, thus calibrating the off-line programs and defining the distance and orientation of the tool, fixture [39], peripheral, and other key components.

The visual datum reference tool [10] calibrates the paths to the robot while involving the calibration of the peripherals of the robot.

The visual datum reference tool [10] aids in the kitting; or reverse engineering; of robotic systems for future use in conjunction with robotic simulation software; enabling integrators the ability to update their simulation CAD files to the "real world" positions.

The technology uses existing body-in-white procedures, personnel computers and software and ways of communicating information amongst the trades.

Figure 5:
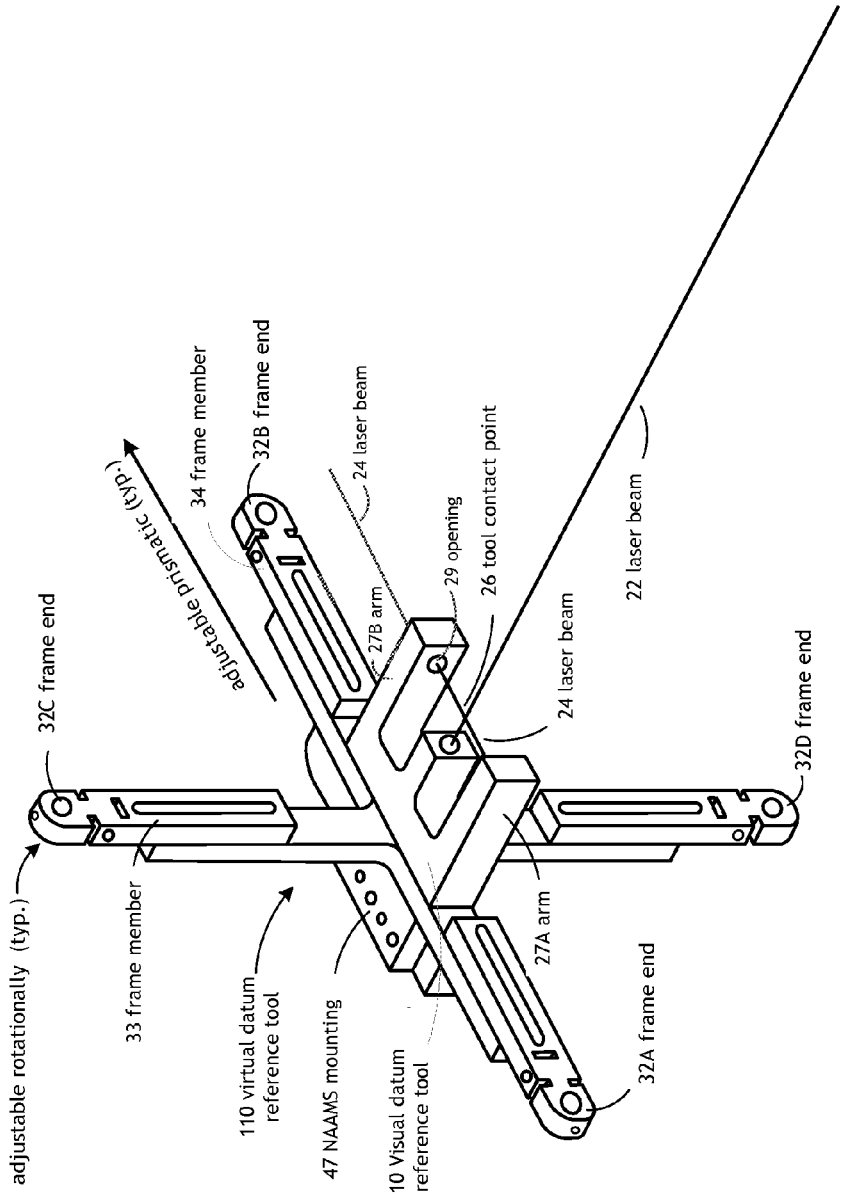
FIG. 5 depicts a perspective view of a second preferred embodiment of the visual datum reference tool for use with the robot calibration system and method of the present invention, the visual datum reference tool having two beam-projecting lasers being used for aligning the tool center point with a calibration device.
Figure 6:
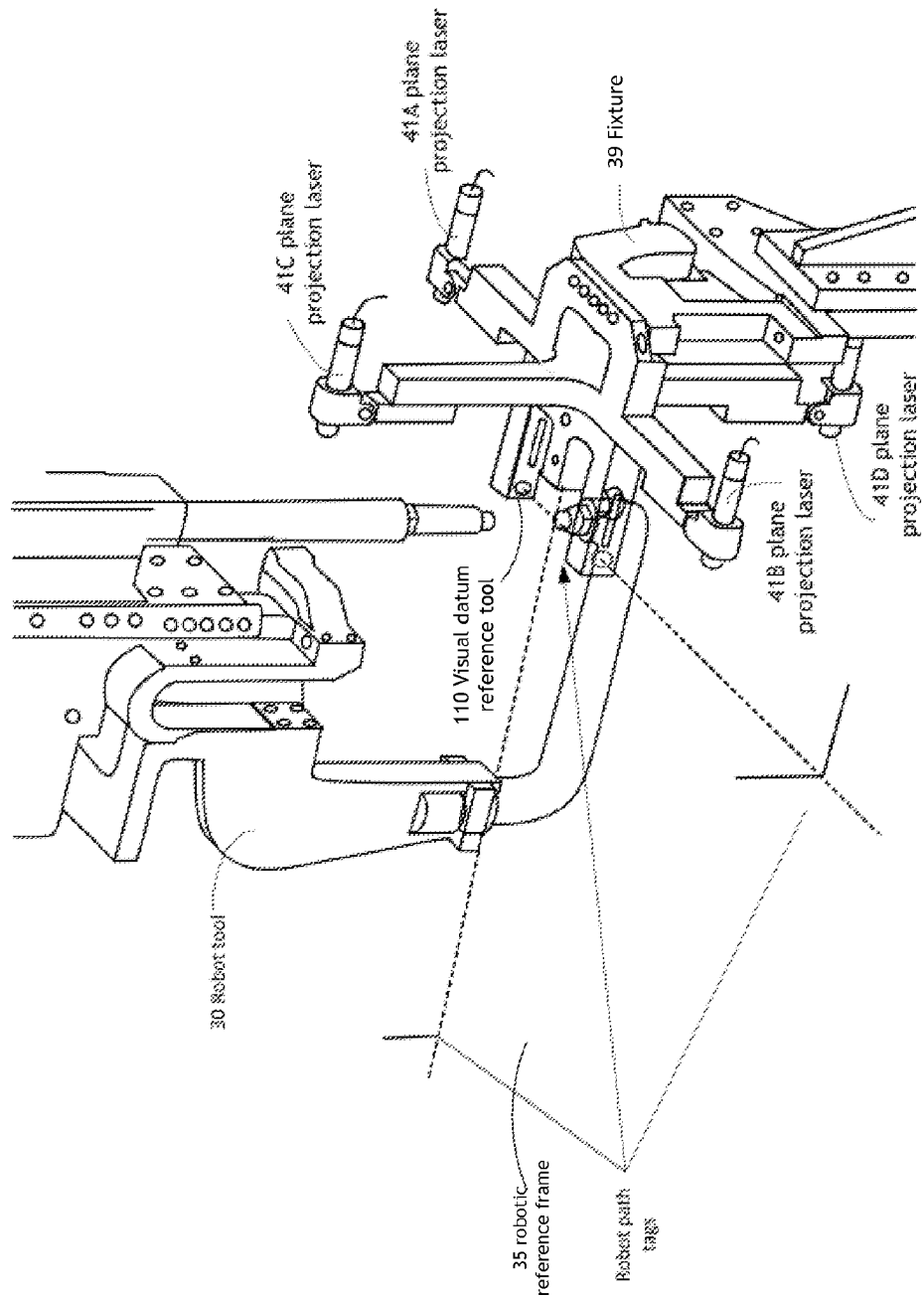
FIG. 6 depicts a perspective view of the visual datum reference tool of FIG. 5 positioned on a fixture, with the robot being aligned to the tool center point of the visual datum reference tool.
Figure 7:
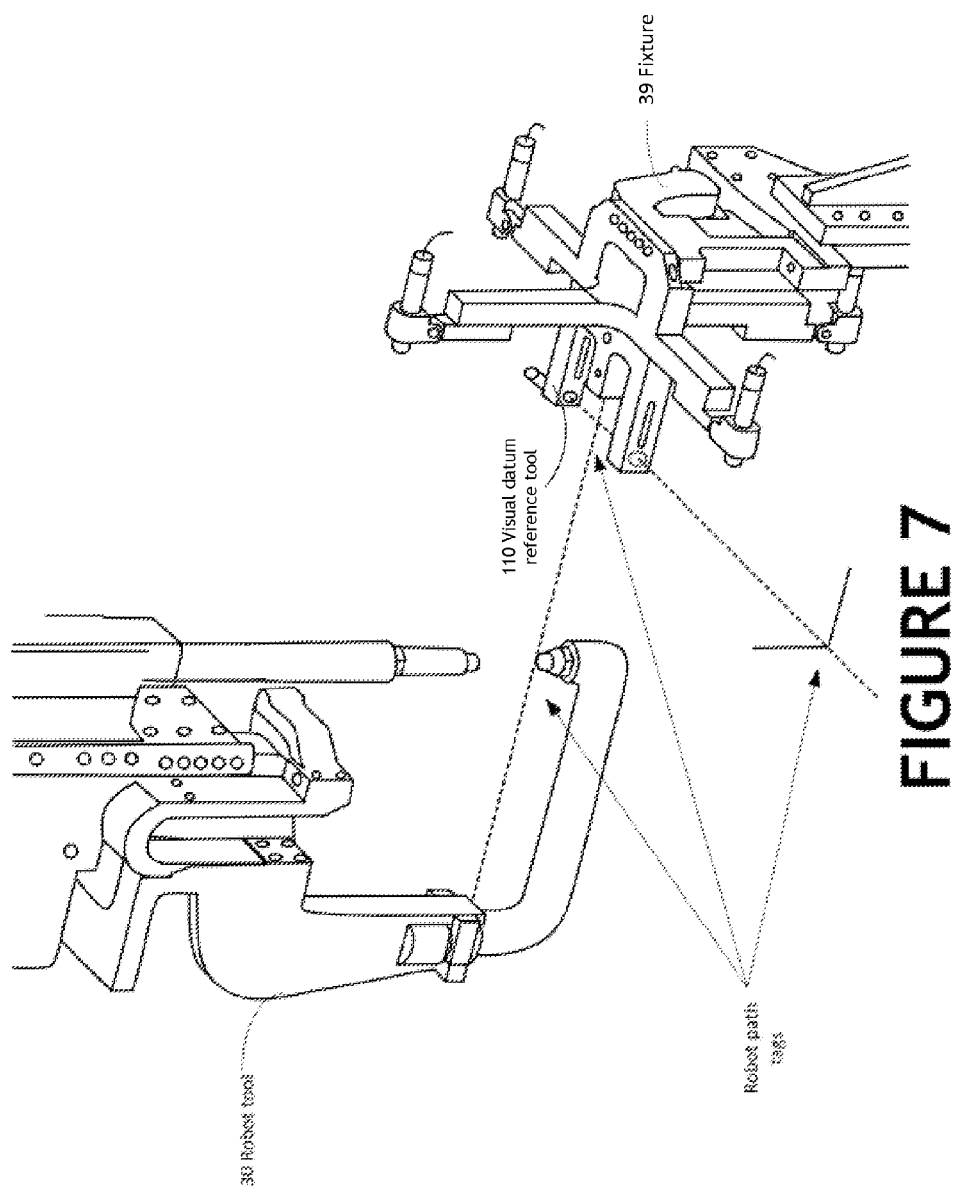
FIG. 7 depicts a perspective view of the visual datum reference tool of FIG. 5 positioned on the fixture as shown in FIG. 6, with the robot being aligned to the tool center point along the x-axis of the first laser beam projected from the visual datum reference tool.
Figure 8:
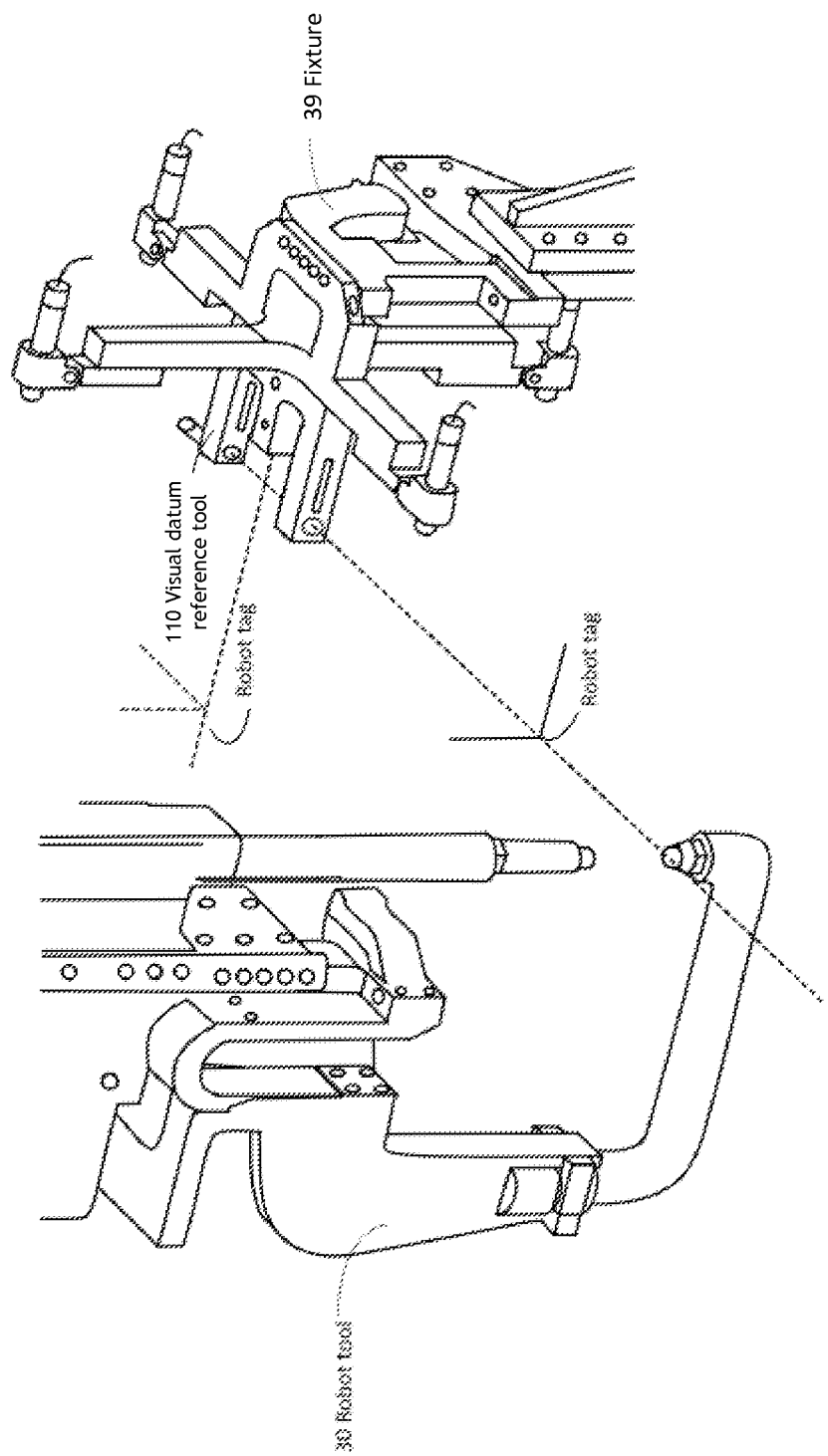
FIG. 8 depicts a perspective view of the visual datum reference tool of FIG. 5 positioned on the fixture as shown FIG. 6, with the robot being aligned to the tool center point along the y-axis of the second laser beam projected from the visual datum reference tool.

FIG. 5 depicts a second preferred embodiment of a visual datum reference tool [110]. An "E-shaped" structure is lays horizontally and is positioned at the center of a frame comprising a vertical frame crossing a horizontal frame.

The visual datum reference tool [110] is used to calibrate the work path of a robot tool based on a tool center point (point in space) [26]. The known point in space [26] is defined in three dimensions (X, Y, and Z) and relative to their rotational axes $R_x$ (pitch), $R_y$ (yaw), and $R_z$ (roll).

The visual datum reference tool [110] includes a horizontal frame member [17] that includes a pair of opposing frame ends [32A and 32B], and a vertical frame member [18] that includes a pair of opposing frame ends [32C and 32D]. A plane-projecting laser [41A, 41B, 41C, and 41D] is preferably disposed at each frame end [32A, 32B, 32C, and 32D], respectively, and a projected laser plane (not shown) is emitted from each of the plane-projecting lasers [41A, 41B, 41C, and 41D], respectively.

Extending along the horizontal frame member [17] are three arms parallel which combine to form a squared "E-shaped" structure [25] which is horizontally aligned and generally centrally disposed relative to horizontal frame member [17] and vertical frame member [18]. The center arm (not numbered) of the E-shaped structure [25] is shorter than the two end arms [27A and 27B].

A first laser beam [22] is emitted from the shortened center arm of the "E-shaped" structure [25] disposed at the proximate center of the visual datum reference tool [110]. A second laser beam [24] is emitted from one of the arms [27B] of an E-shaped structure [25] and is directed into and through an opening 29 in the opposing arm [27A].

The first laser beam-[22] intersects the second laser beam [24] at the tool center point [26]. The first laser beam-[22] is essentially perpendicular and coplanar with the second laser beam [24], defined in three dimensions in terms of X, Y, and Z coordinates.

The laser beams [22 and 24] are focusable points that project the two laser beams emitted from the arm [26B] of the visual datum reference tool [110]. The laser beams [22 and 24] are preferably red laser modules, having focusable dots (3.5v-4.5v 16 mm 5 mw).

The visual datum reference tool [110] includes two (2) laser beams [22 and 24] positioned onto a work piece or tool, at a known location with the two laser beams [22 and 24] intersecting at essentially a 90° angle and continuing to project outward. The mounting is preferably a numerical control block [46] or a NAAMS mounting pattern [47]. The tool center point [26] of the robot defines the correct location of the robotic reference frame [35]. To accomplish this, the robot will record a first point [26] at the intersection of the two (2) laser beams (see FIG. 5). A second point [23] is then selected along the axis of the first laser beam [22] (see FIG. 6). A third point [25] is then selected along the axis of the second laser beam [24] (see FIG. 7).

In other words, the robotic reference frame [35] is defined by the two intersecting laser beams [22 and 24]. Once all three (3) points [22, 23, and 25] are known, the robotic reference frame [35] is generated. The robotic reference frame [35] is then used to adjust the angular position of the robot tool [20], which can involve adjusting either roll and yaw, roll and pitch, yaw and pitch, or roll yaw and pitch of said robot tool [30]. This method is applicable for all robotic processes, including but not limited to, spot welders, material handlers, and MIG welders, assembly, cutting, painting and coating, and polishing and finishing.

Figure 9:
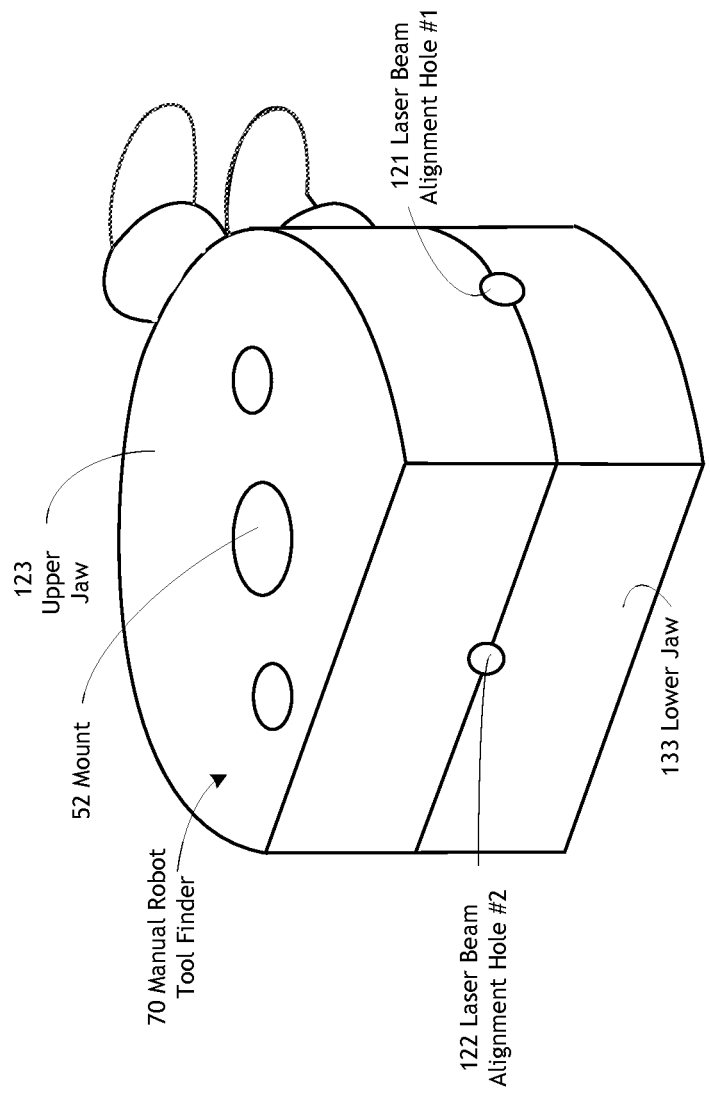
FIG. 9 depicts a perspective view of the preferred embodiment of a manual robotic tool finder for use with the robot calibration system of the present invention.
Figure 10:
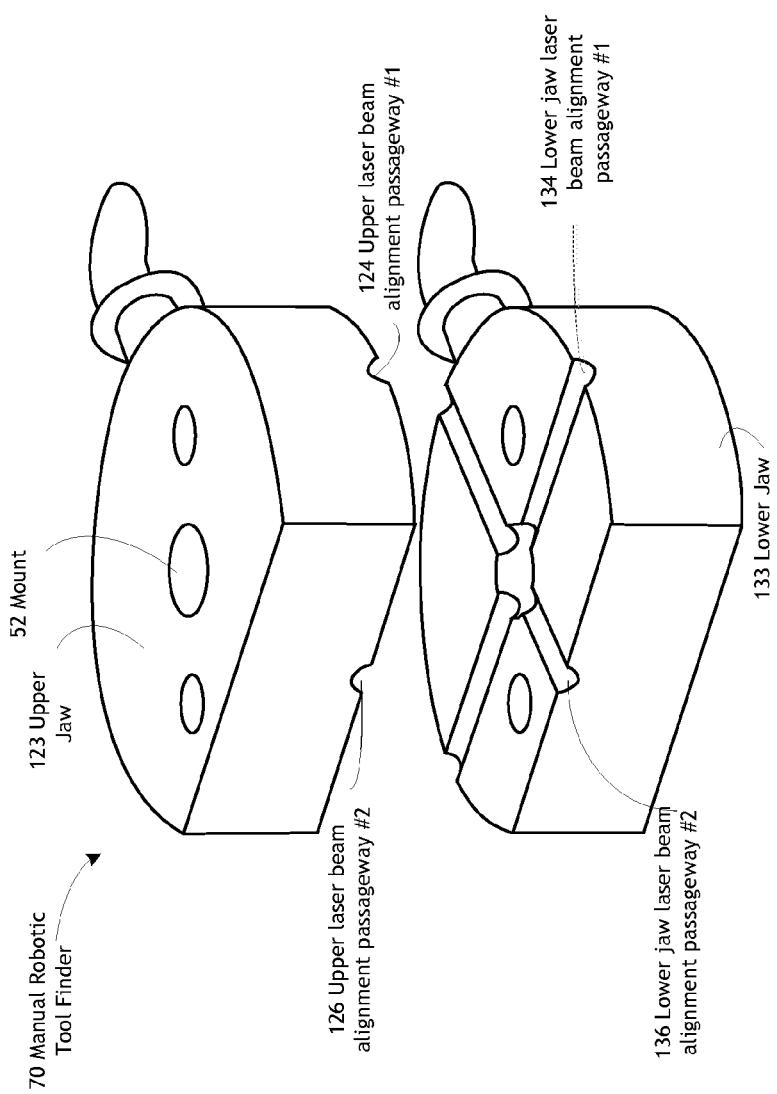
FIG. 10 depicts a perspective view of the manual robotic tool finder of the FIG. 9 from above with the upper and lower jaws separated.
Figure 11:
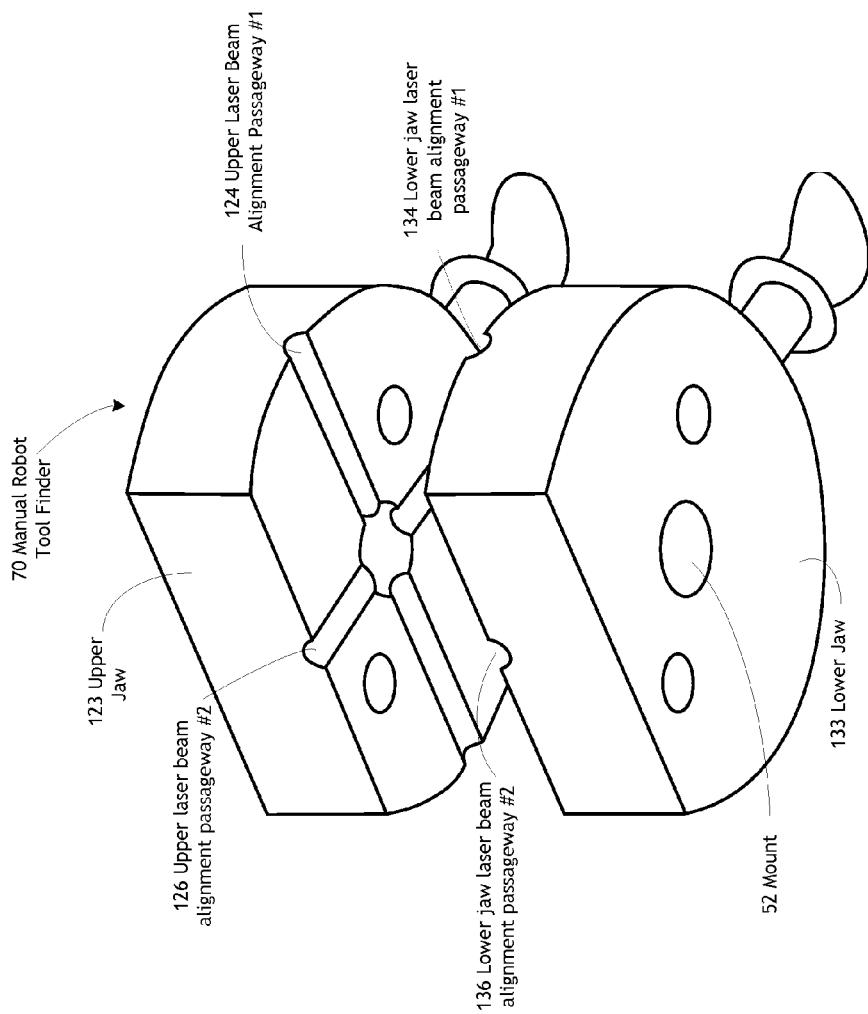
FIG. 11 depicts a perspective view of the manual robotic tool finder of the FIG. 9 from below with the upper and lower jaws separated.

FIGS. 9, 10 and 11 depict the preferred embodiment of a manual robotic tool finder component [70] for use in the robot calibration system of the present invention. The manual robotic tool finder [70] has an upper jaw [123] and a lower jaw [133]. A pair of spring grips [140A and 140B] positioned at the rear of the device enables the device to be opened and closed to gain access to the passageways. A pair of passageways [121 and 122] extend through each jaw normal to each other forming a pair of intersecting passageways [124 and 126] through said upper jaw [123] and a pair of passageways [134 and 136] through said lower jaw [133]. The manual robotic work finder [70] is placed over the tool center point [26] of the visual datum reference tool [10 or 20]. The manual robotic tool finder [70] calibrates the robot work path. The manual work finder [70] includes a mount opening [52] extending therethrough that is used for mounting the device over the weld tips of a weld gun or pin on an end-of-arm-tooling.

Figure 12:
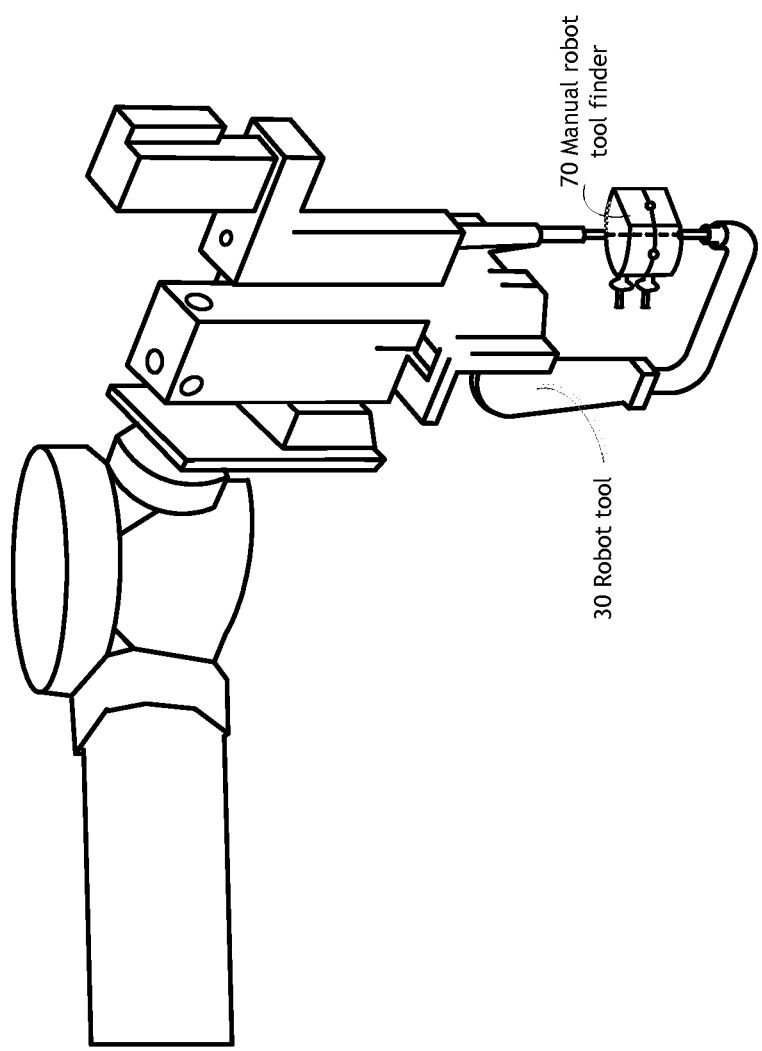
FIG. 12 depicts a perspective view of the manual robotic tool finder of FIG. 9, the manual robotic tool finder being mounted onto a weld gun.

FIG. 12 depicts the manual robotic tool finder [70] mounted in a robot tool [50].

Figure 13:
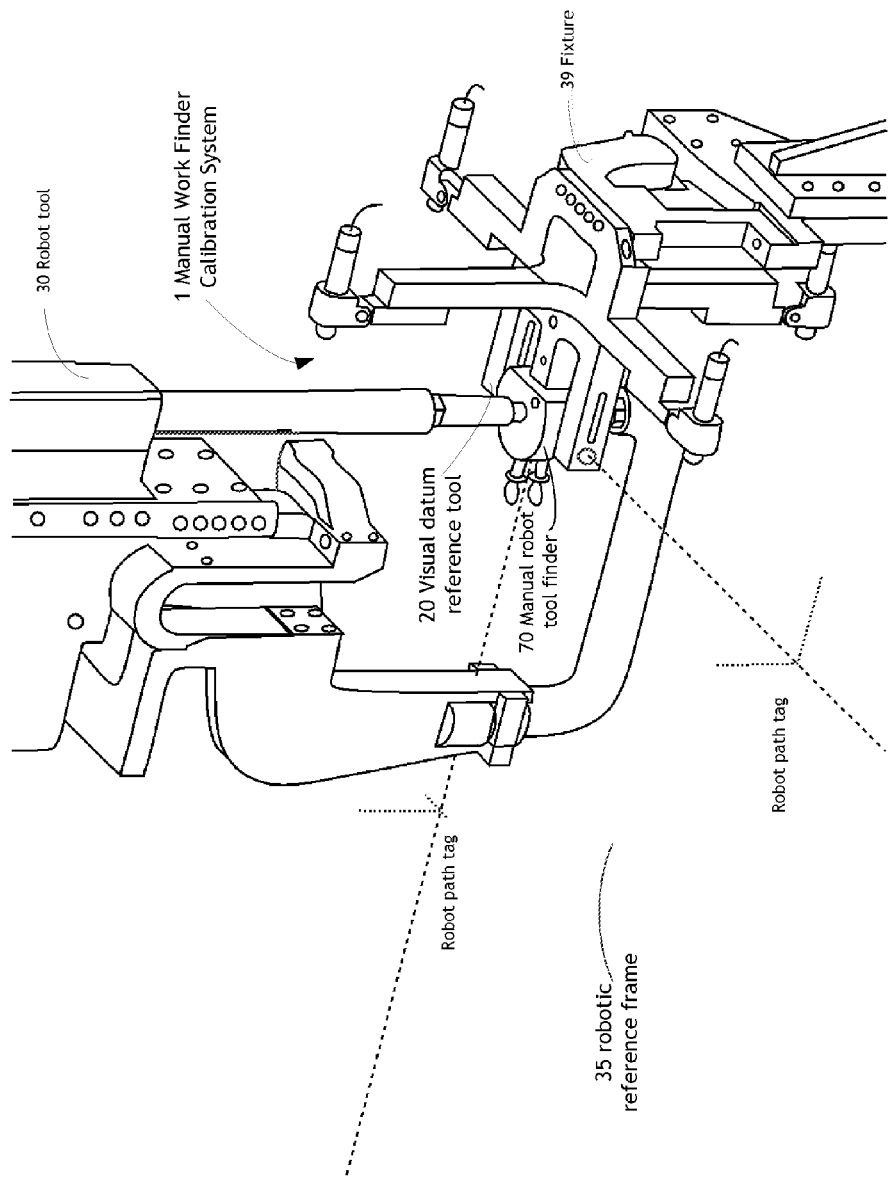
FIG. 13 depicts a perspective view of a first preferred embodiment of the robot calibration system of the present invention, the robot calibration system includes the visual datum reference tool of FIG. 5 mounted on a fixture, and the manual robotic tool finder of FIG. 9 is mounted on a weld gun and positioned at the tool center point of the visual datum reference tool.
Figure 14:
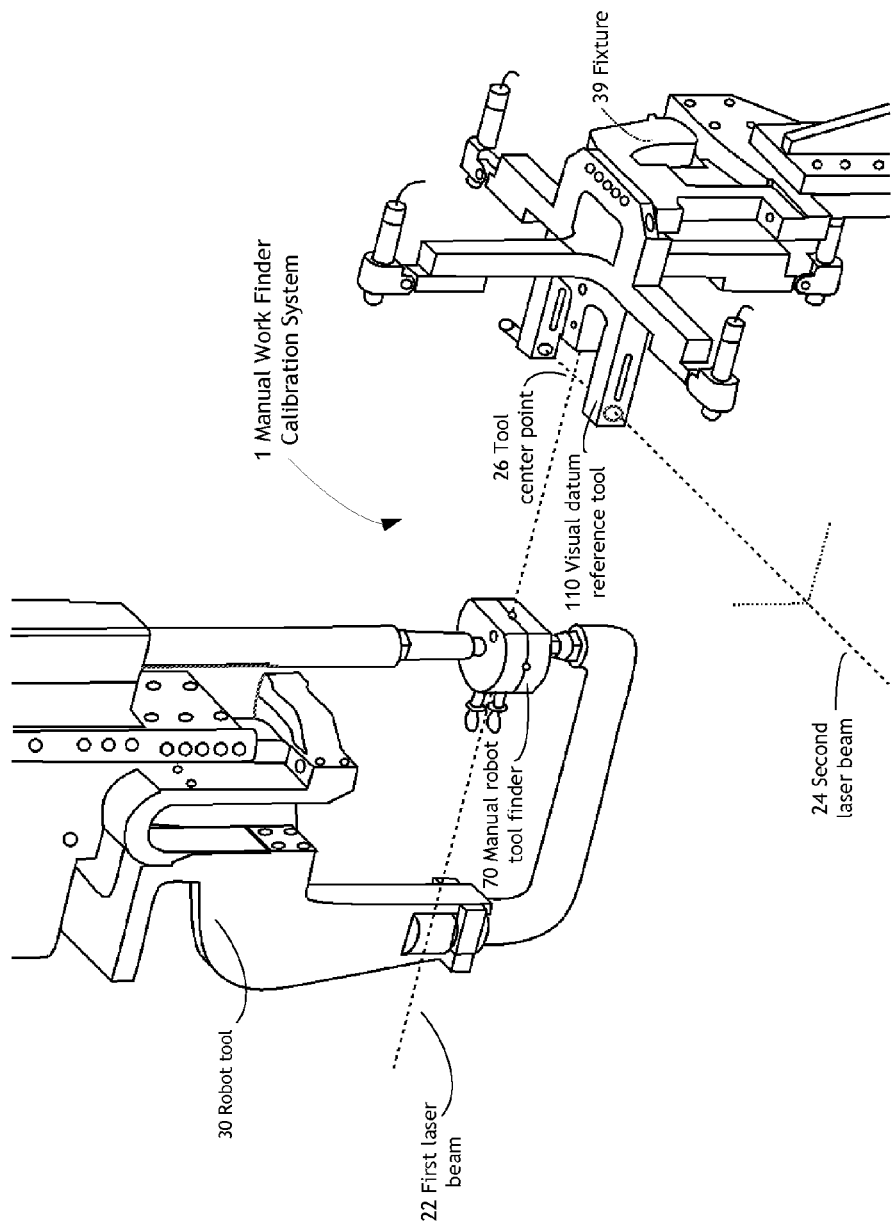
FIG. 14 depicts a second perspective view of the first preferred embodiment of the robot calibration system of FIG. 13, the manual robotic tool finder still being mounted onto the weld gun but being repositioned and moved downstream of the first laser beam being emitted from the visual datum reference tool, the visual datum reference tool still being mounted onto the fixture.
Figure 15:
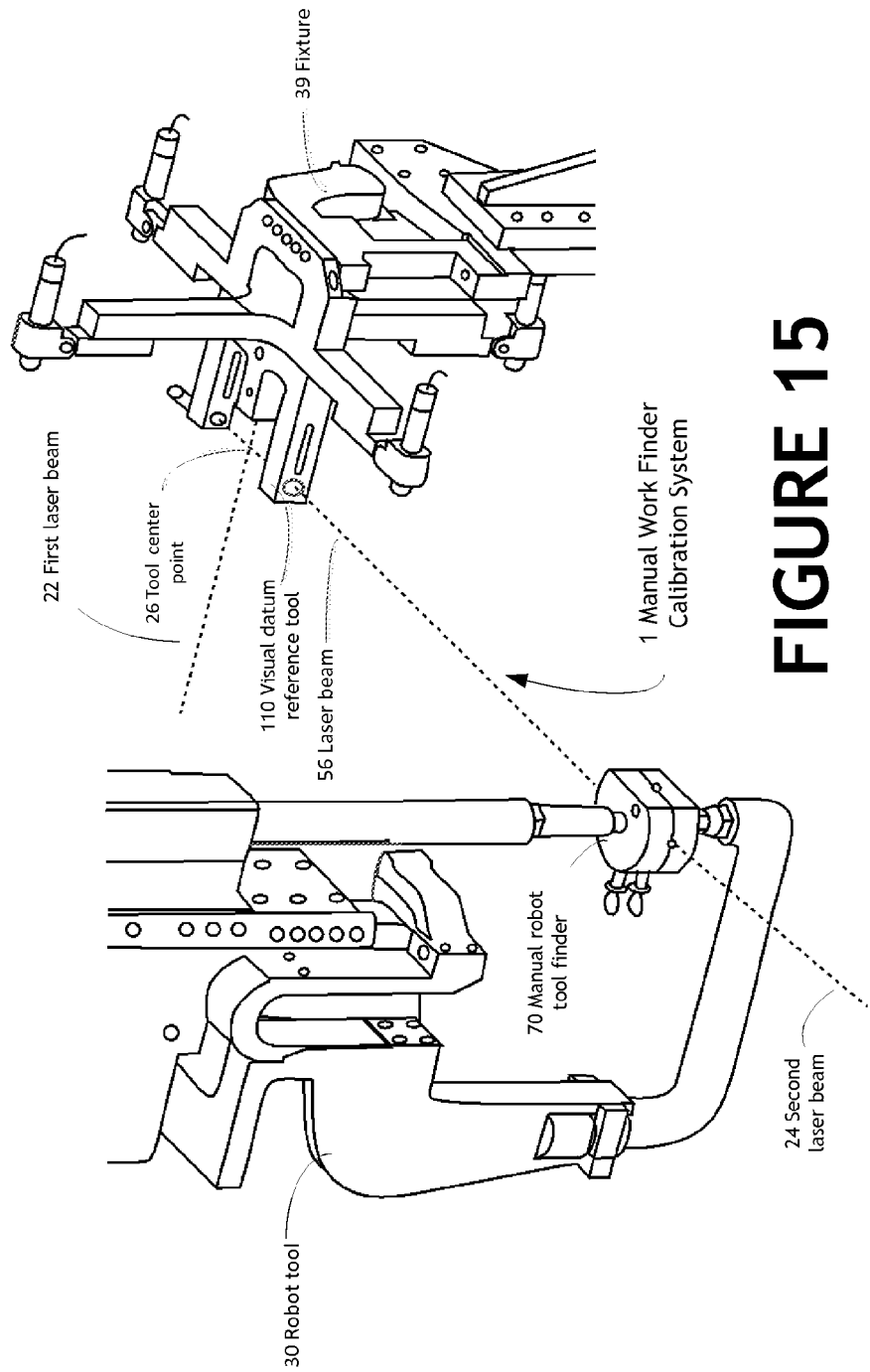
FIG. 15 depicts a third perspective view of the first preferred embodiment of the robot calibration system of FIG. 13, the manual robotic tool finder still being mounted onto the weld gun but being repositioned and moved downstream of the second laser beam being emitted from the visual datum reference tool, the visual datum reference tool still being mounted onto the fixture.

FIGS. 13, 14, and 15 depict the first preferred embodiment of the robotic calibration system [1] of the present invention. The manual robotic tool finder [70] is mounted on a robot tool [30] being used with the visual datum reference tool [20]

mounted on fixture [39]. The manual robotic tool finder [70] cooperatively engages with the visual datum reference tool [20], which defines a robotic reference frame [35] (a frame in space that is relative to an industrial robot and workpiece tool) that is otherwise an abstract relationship and cannot be seen. The visual datum reference tool [10] includes two (2) laser beams positioned onto a work piece or tool, at a known location with the two laser beams [22 and 24] intersecting at essentially a 90° angle and continuing to project outward. The mounting is preferably a numerical control block [46] or a NAAMS mounting pattern [47]. The tool center point [26] of the robot defines the correct location of the robotic reference frame [35]. To accomplish this, the robot will record a first point [26] at the intersection of the two (2) laser beams (see FIG. 13). A second point [23] is then selected along the axis of the first laser beam [22] (see FIG. 14). A third point [25] is then selected along the axis of the second laser beam [24] (see FIG. 15).

Figure 16:
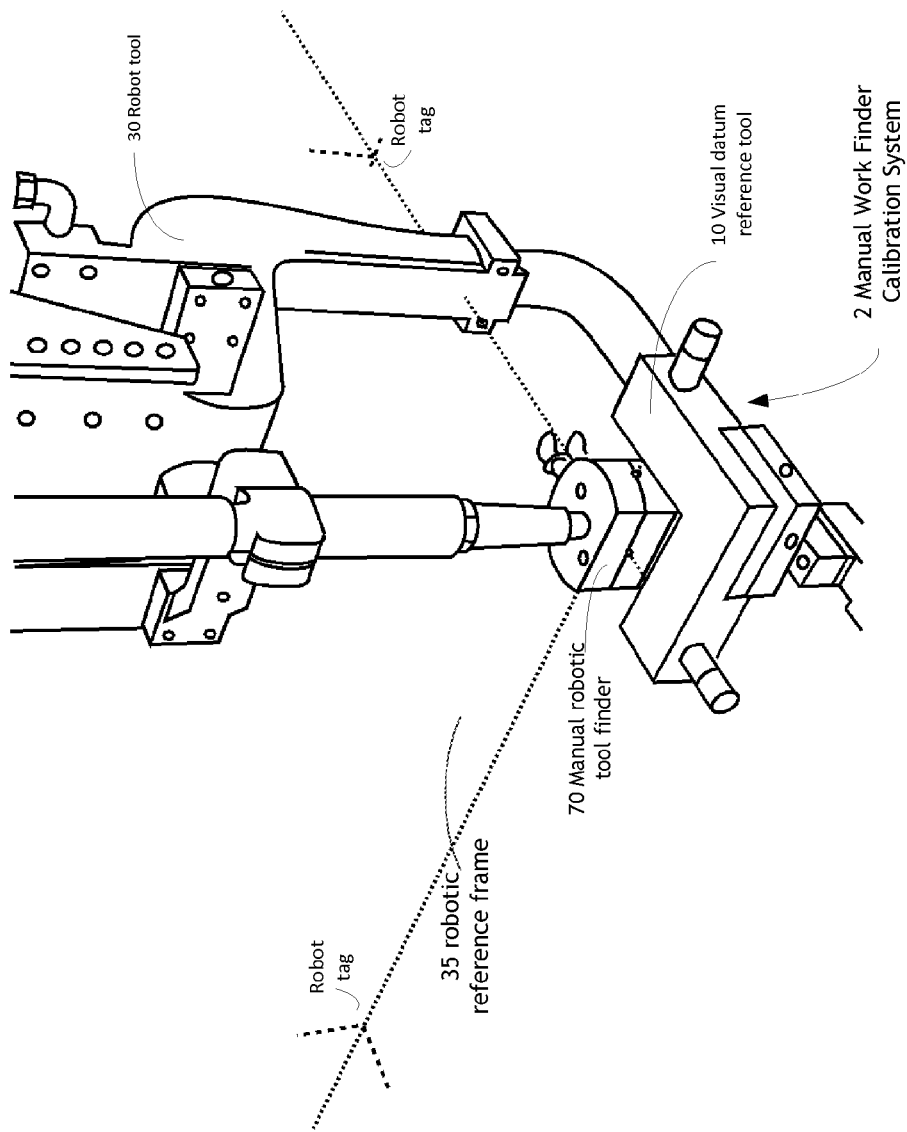
FIG. 16 depicts a perspective view of a second preferred embodiment of the robot calibration system of the present invention, the robot calibration system includes the visual datum reference tool of FIGS. 1A, 1B, and 1C mounted on a fixture, and the manual robotic tool finder of FIG. 9 is mounted on a weld gun and positioned at the tool center point of the visual datum reference tool.
Figure 17:
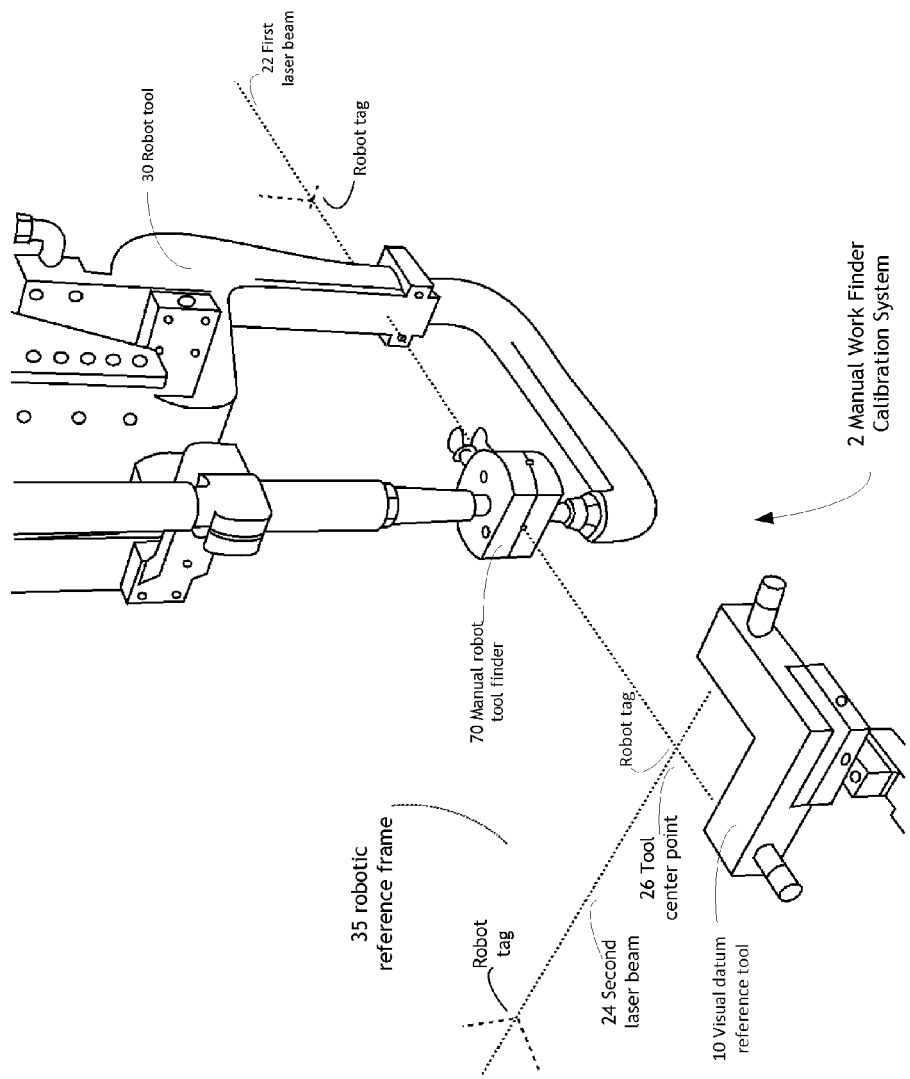
FIG. 17 depicts a second perspective view of the second preferred embodiment of the robot calibration system of FIG. 16, the manual robotic tool finder still being mounted onto the weld gun but being repositioned and moved downstream of the first laser beam being emitted from the visual datum reference tool, the visual datum reference tool still being mounted onto the fixture.
Figure 18:
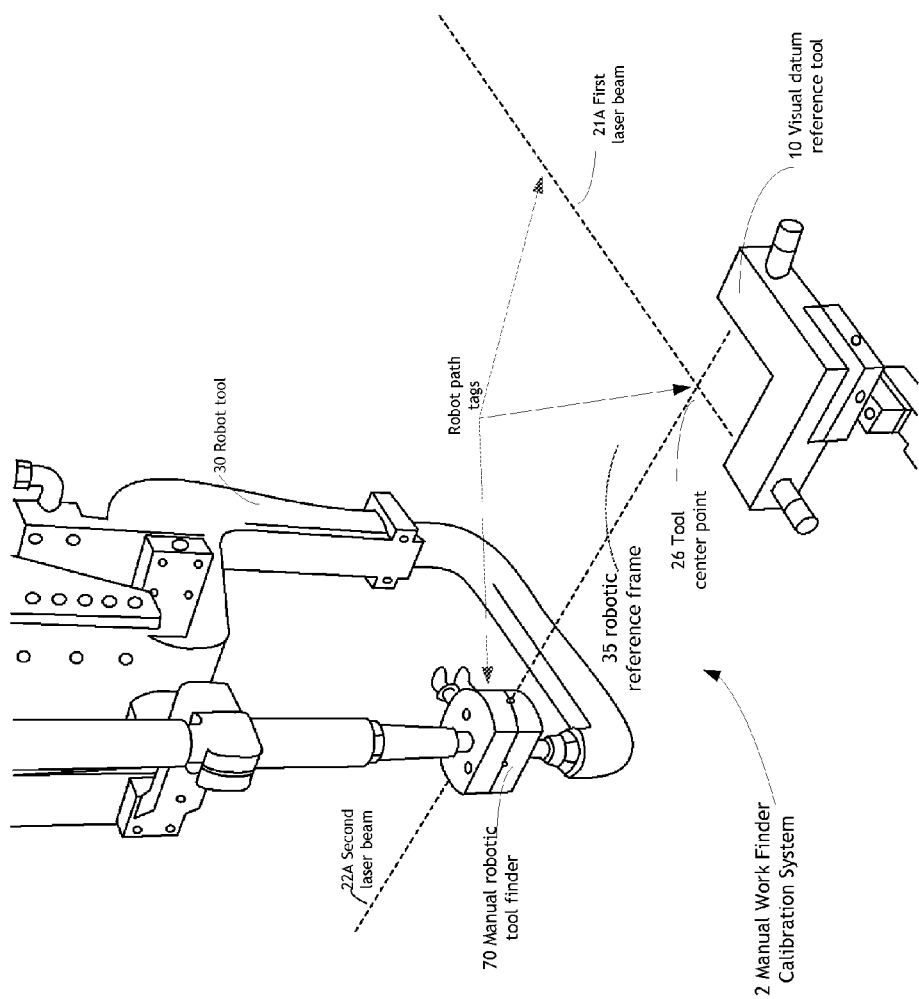
FIG. 18 depicts a third perspective view of the second preferred embodiment of the robot calibration system of FIG. 16, the manual robotic tool finder still being mounted onto the weld gun but being repositioned and moved downstream of the second laser beam being emitted from the visual datum reference tool, the visual datum reference tool still being mounted onto the fixture.

FIGS. 16, 17, and 18 depict the second preferred embodiment of the robotic calibration system [2] of the present invention. The manual robotic tool finder [70] is mounted on a robot tool [30] being used with the visual datum reference tool [20] mounted on fixture [39]. The manual robotic tool finder [70] cooperatively engages with the visual datum reference tool [20], which defines a robotic reference frame [35] (a frame in space that is relative to an industrial robot and workpiece tool) that is otherwise abstract and cannot be seen. The visual datum reference tool [10] includes two laser mounted onto a work piece or tool, at a known location with the two laser beams [22 and 24] intersecting at essentially a 90° angle and continuing to project outward. The mounting is preferably a numerical control block [46] or a NAAMS mounting pattern [47]. The tool center point [26] of the robot defines the correct location of the robotic reference frame [35]. To accomplish this, the robot will record a first point [26] at the intersection of the two laser beams (see FIG. 16). A second point [23] is then selected along the axis of the first laser beam [22] (see FIG. 17). A third point [25] is then selected along the axis of the second laser beam [24] (see FIG. 18).

Figure 19:
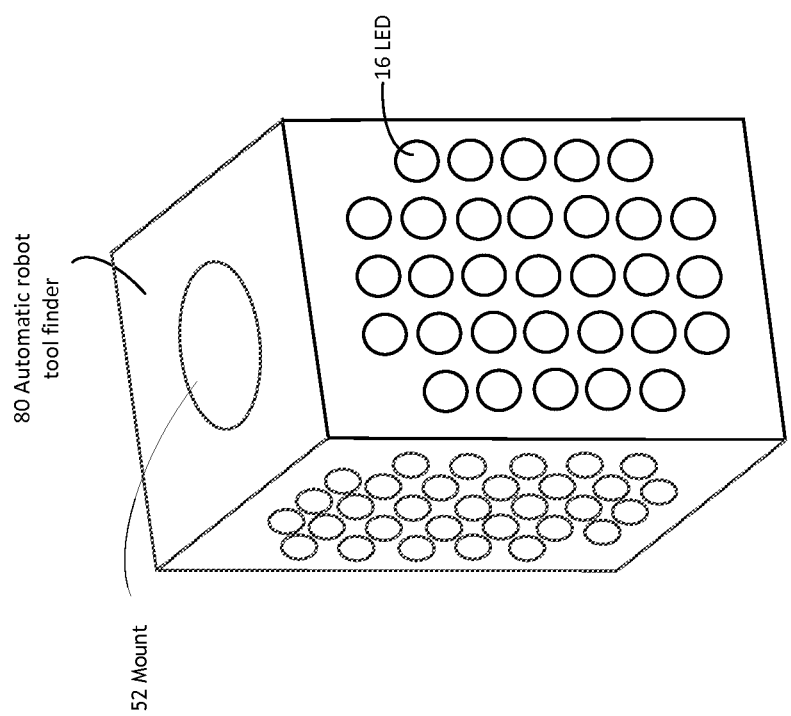
FIG. 19 depicts a perspective view of the preferred embodiment of an automatic robotic tool finder for use with the robot calibration system of the present invention.

FIG. 19 depicts the preferred embodiment of an automatic robotic tool finder component [80] for use in the robot calibration system of the present invention. In one preferred embodiment, there is a grid of LEDs [16] on all four sides of the alignment tool which will allow the robot to be calibrated to any of the LEDs [16]. In another preferred embodiment, there is a grid of LEDs [16] on two adjacent sides of the alignment tool which will enable the robot to be calibrated to any of the LEDs [16]. The automatic work finder [80] includes a mount opening [52] extending therethrough that is used for mounting the device over the weld tips of a weld gun or pin on an end-of-arm-tooling.

While a cube is shown, other preferred geometric shapes include parallelepipeds, spheres, cylinders, pyramids, cones, capsules, and ellipsoids. Spheres have an added advantage in that there are no edges and spaces between the LEDs, as is the case when flat or pointed geometric surfaces are used.

Figure 20:
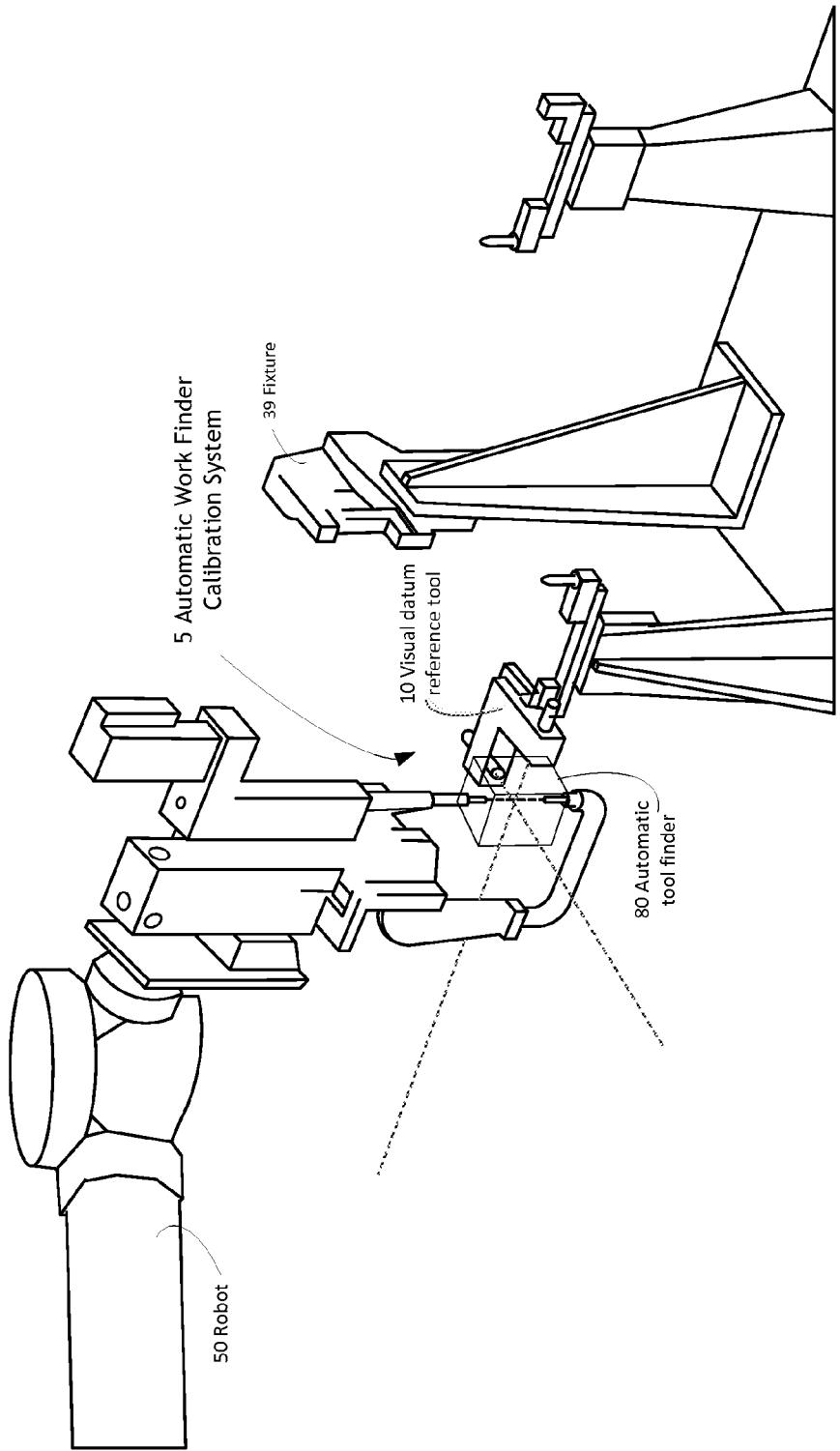
FIG. 20 depicts a perspective view of a third preferred embodiment of the robot calibration system of the present invention, the robot calibration system includes the visual datum reference tool of FIG. 1 mounted on a fixture, and the automatic robotic tool finder of FIG. 19 is mounted on a weld gun and positioned at the tool center point of the visual datum reference tool.
Figure 21:
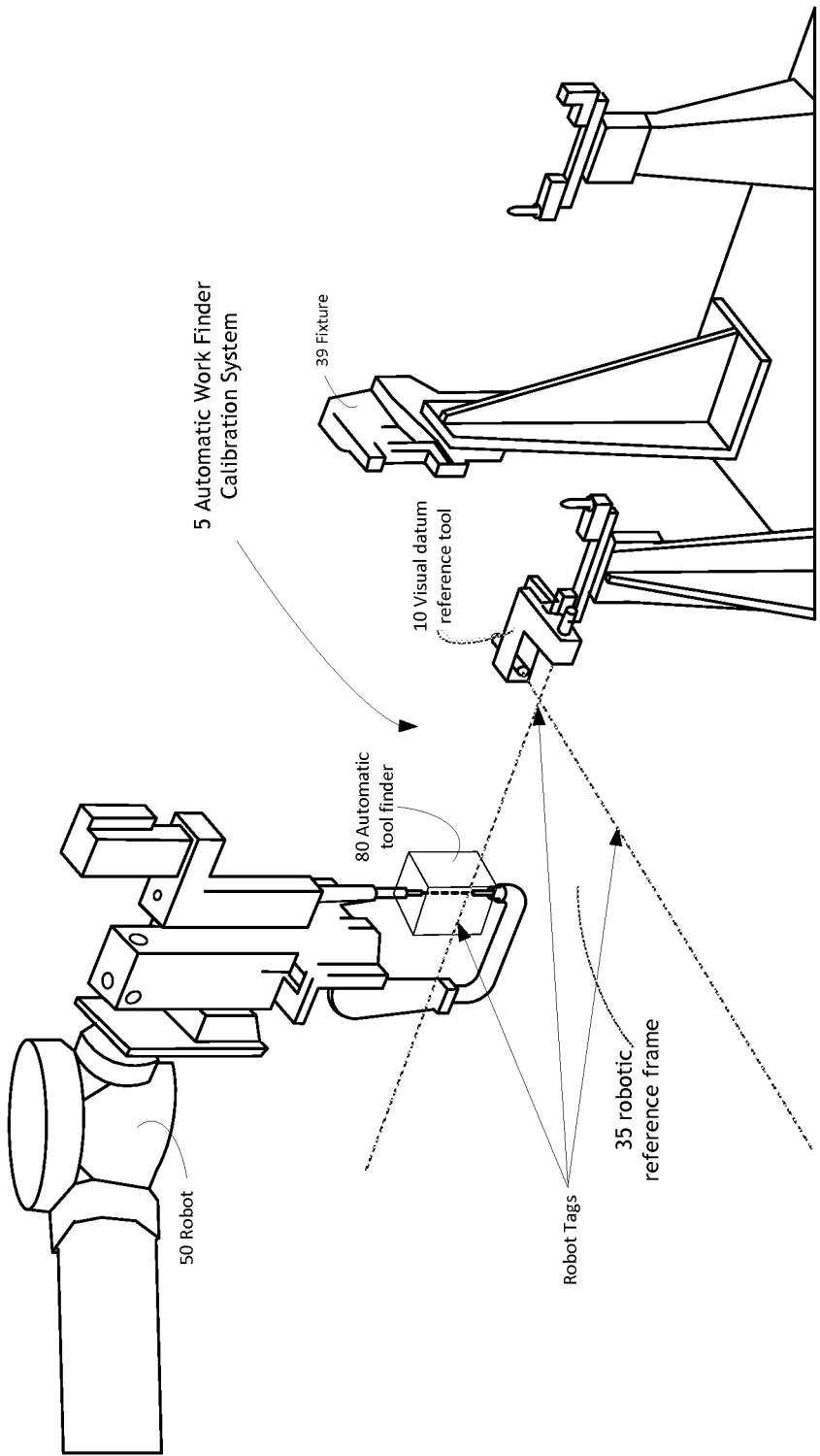
FIG. 21 depicts a second perspective view of the third preferred embodiment of the robot calibration system of FIG. 20, the automatic robotic tool finder still being mounted onto the weld gun but being repositioned and moved downstream of the first laser beam being emitted from the visual datum reference tool, the visual datum reference tool still being mounted onto the fixture.
Figure 22:
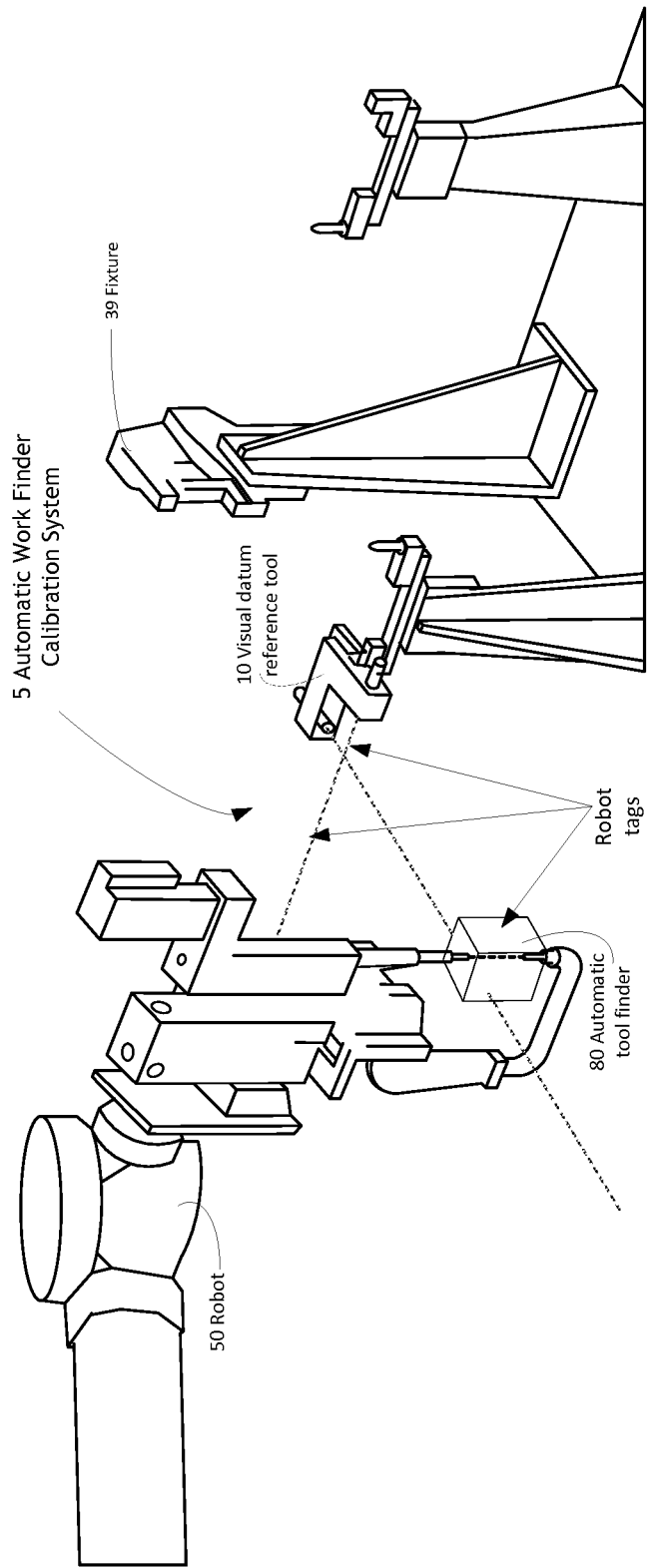
FIG. 22 depicts a third perspective view of the third preferred embodiment of the robot calibration system of FIG. 20, the automatic robotic tool finder still being mounted onto the weld gun but being repositioned and moved downstream of the second laser beam being emitted from the visual datum reference tool, the visual datum reference tool still being mounted onto the fixture.

FIGS. 20, 21, and 22 depict the three preferred embodiment of the robotic calibration system [3] of the present invention. The automatic robotic tool finder [80] is mounted on a robot tool [30] being used with the visual datum reference tool [10] mounted on fixture [39]. The automatic robotic tool finder [80] cooperatively engages with the visual datum reference tool [10], which defines a robotic reference frame [35] that is otherwise abstract and cannot be seen. The visual datum reference tool [10] includes two lasers mounted onto a work piece or tool, at a known location with the two laser beams [22 and 24] intersecting at essentially a 90° angle and continuing to project outward. The mounting is preferably a numerical control block [46] or a NAAMS mounting pattern [47]. The tool center point [26] of the robot defines the correct location of the robotic reference frame [28]. To accomplish this, the robot will record a first point [26] at the intersection of the two laser beams (see FIG. 20). A second point [23] is then selected along the axis of the first laser beam [22] (see FIG. 21). A third point [25] is then selected along the axis of the second laser beam [24] (see FIG. 22).

Figure 23:
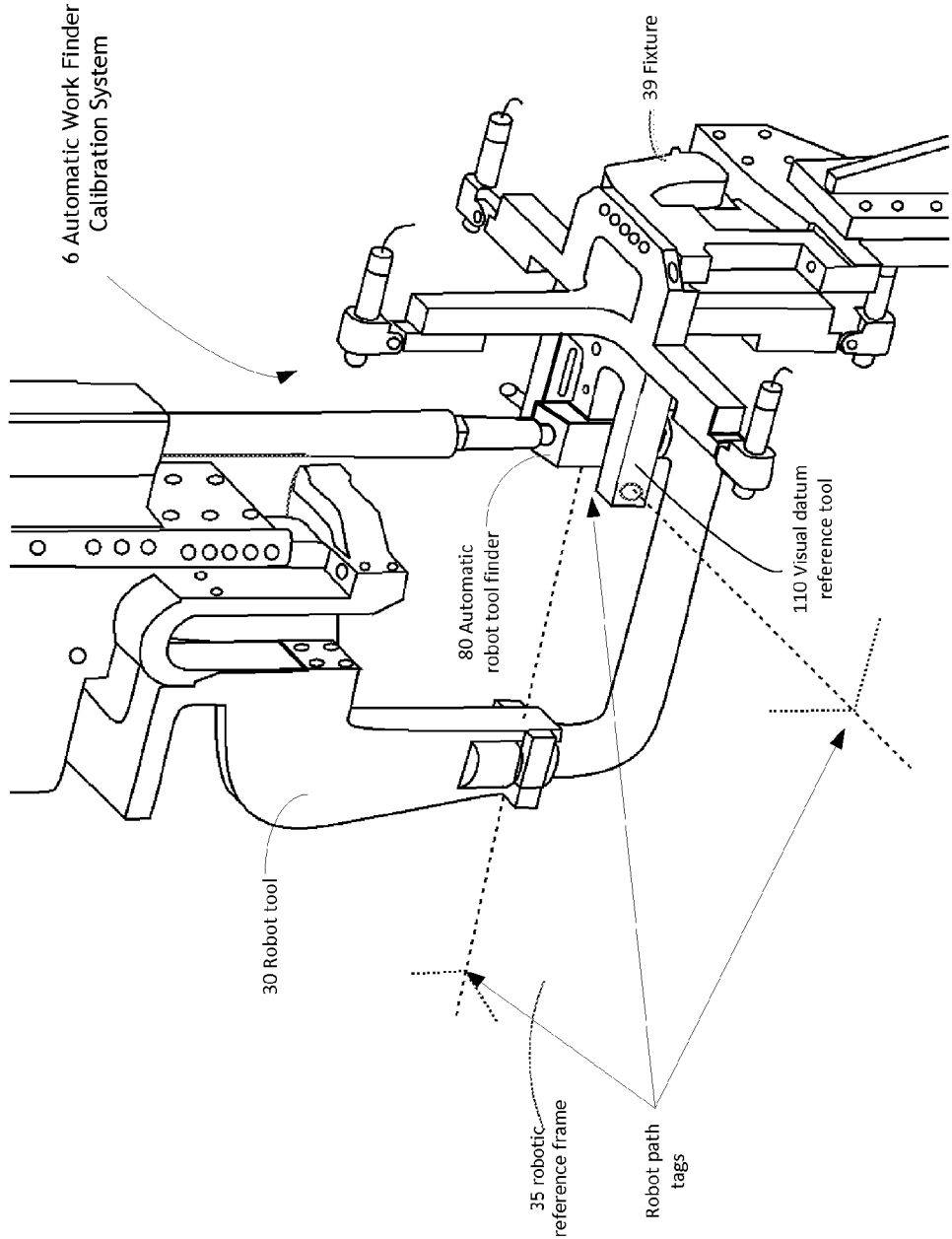
FIG. 23 depicts a perspective view of a fourth preferred embodiment of the robot calibration system of the present invention, the robot calibration system includes the visual datum reference tool of FIG. 5 mounted on a fixture, and the automatic robotic tool finder of FIG. 19 is mounted on a weld gun and positioned at the tool center point of the visual datum reference tool.
Figure 24:
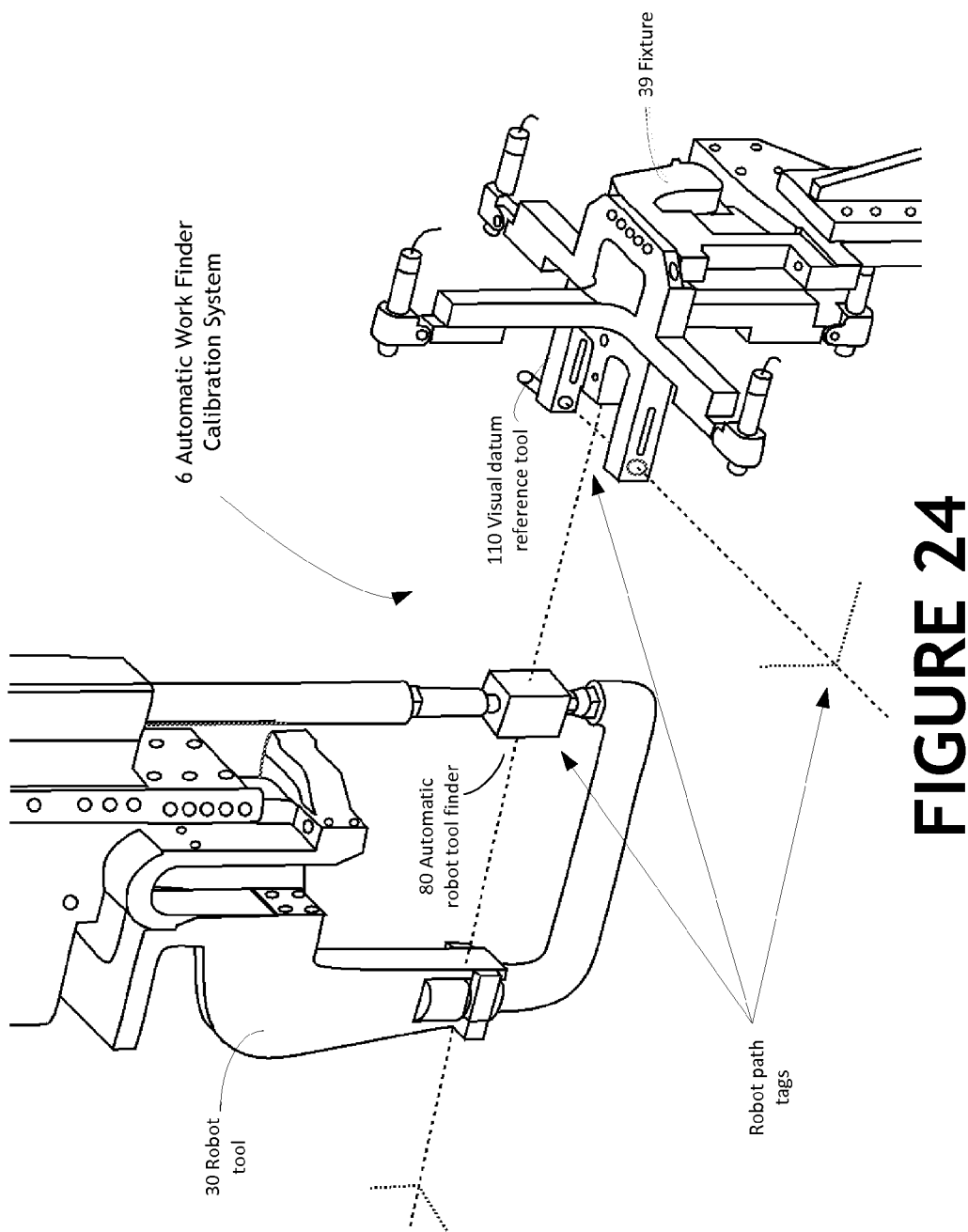
FIG. 24 depicts a second perspective view of the fourth preferred embodiment of the robot calibration system of FIG. 23, the automatic robotic tool finder still being mounted onto the weld gun but being repositioned and moved downstream of the first laser beam being emitted from the visual datum reference tool, the visual datum reference tool still being mounted onto the fixture.
Figure 25:
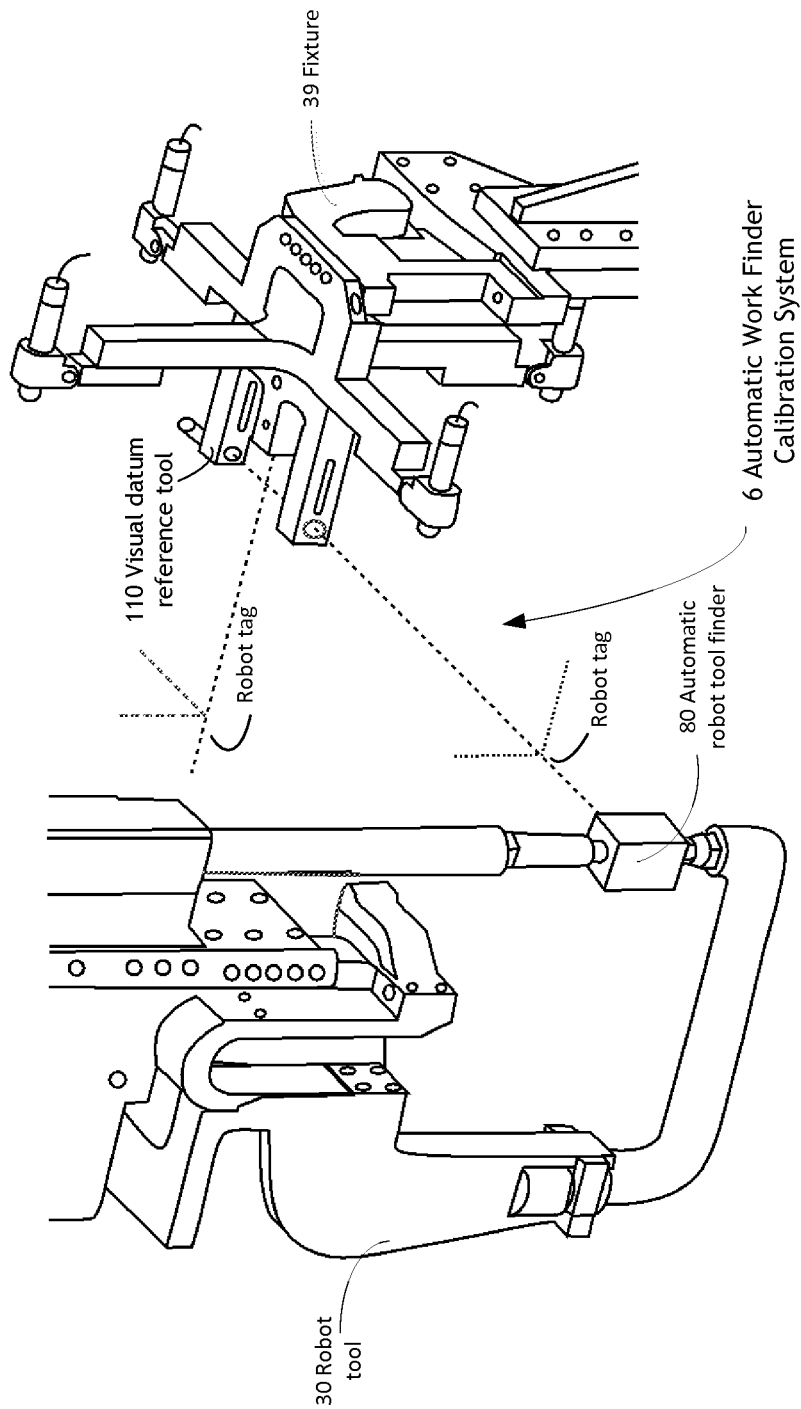
FIG. 25 depicts a third perspective view of the fourth preferred embodiment of the robot calibration system of FIG. 23, the automatic robotic tool finder still being mounted onto the weld gun but being repositioned and moved downstream of the second laser beam being emitted from the visual datum reference tool, the visual datum reference tool still being mounted onto the fixture.

FIGS. 23, 24, and 25 depict the fourth preferred embodiment of the robotic calibration system [5] of the present invention. The automatic robotic tool finder [80] is mounted on a robot tool [30] being used with the visual datum reference tool [20] mounted on fixture [39]. The automatic robotic tool finder [80] cooperatively engages with the visual datum reference tool [10], which defines a robotic reference frame [35] that is otherwise abstract and cannot be seen. The visual datum reference tool [10] includes two lasers mounted onto a work piece or tool, at a known location with the two laser beams [22 and 24] intersecting at essentially a 90° angle and continuing to project outward. The mounting is preferably a numerical control block [46] or a NAAMS mounting pattern [47]. The tool center point [26] of the robot defines the correct location of the robotic reference frame [28]. To accomplish this, the robot will record a first point [26] at the intersection of the two laser beams (see FIG. 23). A second point [23] is then selected along the axis of the first laser beam [22] (see FIG. 24). A third point [25] is then selected along the axis of the second laser beam [24] (see FIG. 25).

Figure 26:
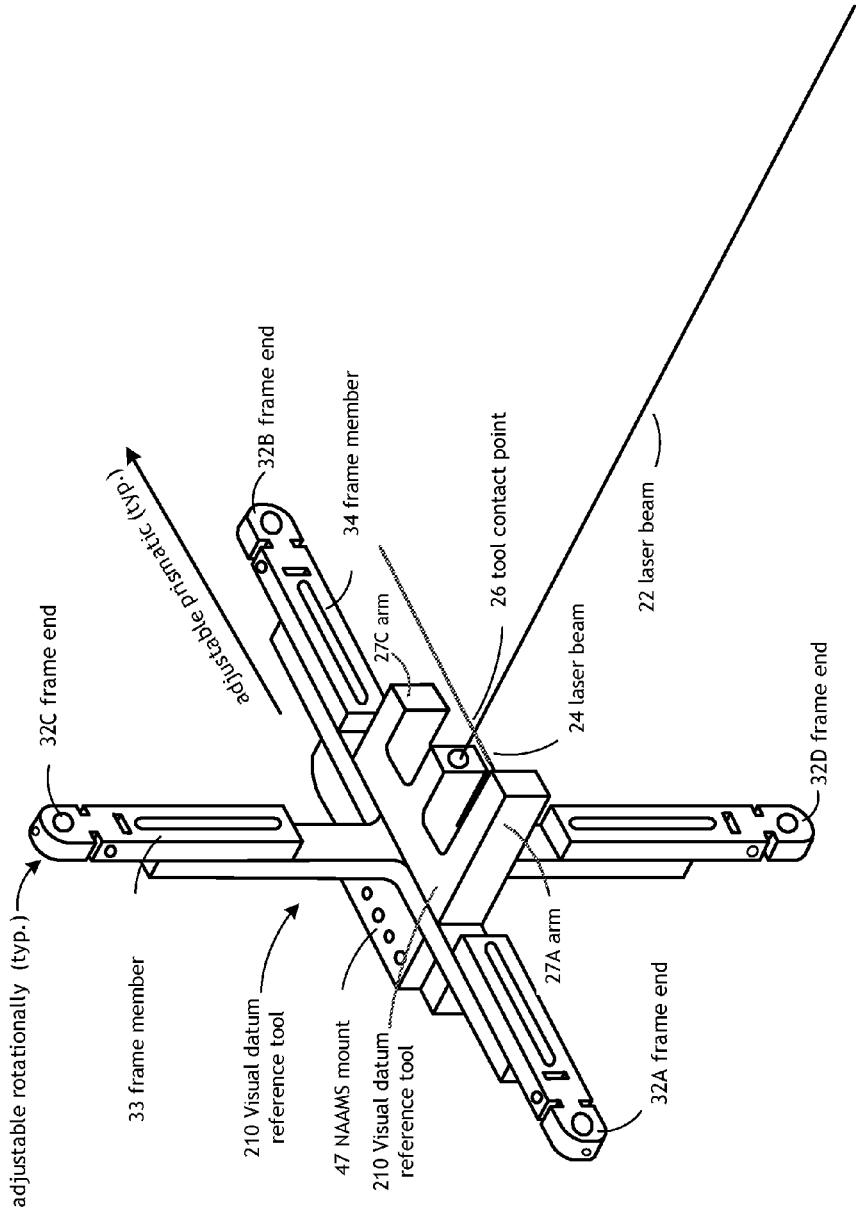
FIG. 26 depicts a perspective view of a third preferred embodiment of the visual datum reference tool for use with the robot calibration system and method of the present invention, the visual datum reference tool having two beam-projecting laser beams being used for aligning the tool center point with a calibration device.

FIG. 26 depicts a perspective view of a third preferred embodiment of the visual datum reference tool for use with the robot calibration systems of the present invention, the visual datum reference tool [210] having two beam-projecting laser beams [22 and 24] being used for aligning the tool center point with a calibration device. In this embodiment, one of the arms of the E-shaped structure [27C] is truncated enabling laser beam [24] to extend beyond the visual datum reference tool [210], unimpeded.

The visual datum reference tool [210] is used to calibrate the work path of a robot tool based on a tool center point (point in space) [26]. The known point in space [26] is defined in three dimensions (X, Y, and Z) and relative to their rotational axes $R_x$ (pitch), $R_y$ (yaw), and $R_z$ (roll).

The visual datum reference tool [210] includes a horizontal frame member [17] that includes a pair of opposing frame ends [32A and 32B], and a vertical frame member [18] that includes a pair of opposing frame ends [32C and 32D]. A plane-projecting laser [41A, 41B, 41C, and 41D] is preferably disposed at each frame end [32A, 32B, 32C, and 32D], respectively, and a projected laser plane (not shown) is emitted from each of the plane-projecting lasers [41A, 41B, 41C, and 41D], respectively.

Extending along the horizontal frame member [17] are three arms parallel which combine to form a squared "E-shaped" structure [25B] which is horizontally aligned and generally centrally disposed relative to horizontal frame member [17] and vertical frame member [18]. A first last laser [22] is emitted by a laser disposed in the center arm of the E-shaped structure [25B]. A second laser beam [24] is emitted from one of the arms [27A] and is directed unimpeded past the visual datum reference tool [210].

The first laser beam-[22] intersects the second laser beam [24] at the tool center point [26]. The first laser beam-[22] is essentially perpendicular and coplanar with the second laser beam [24], defined in three dimensions in terms of X, Y, and Z coordinates.

The "E-shaped" structure [25B] is positioned at the center of the horizontal frame member [17] and the vertical frame member [18], laser beam [24] is essentially coplanar with the two projected laser planes (not shown) emitted from the plane-projecting lasers [41 and 42] emitted from frame ends [32A and 32B]. Similarly, laser beam [22] is essentially coplanar with the two projected laser planes (not shown) emitted from the plane-projecting lasers [43 and 44] emitted from frame ends [32C and 32D]. The visual datum reference tool [120] is mountable onto a fixture [39] and enables a robot work path to be calibrated relative to the known point in space or tool center point [26].

Figure 27:
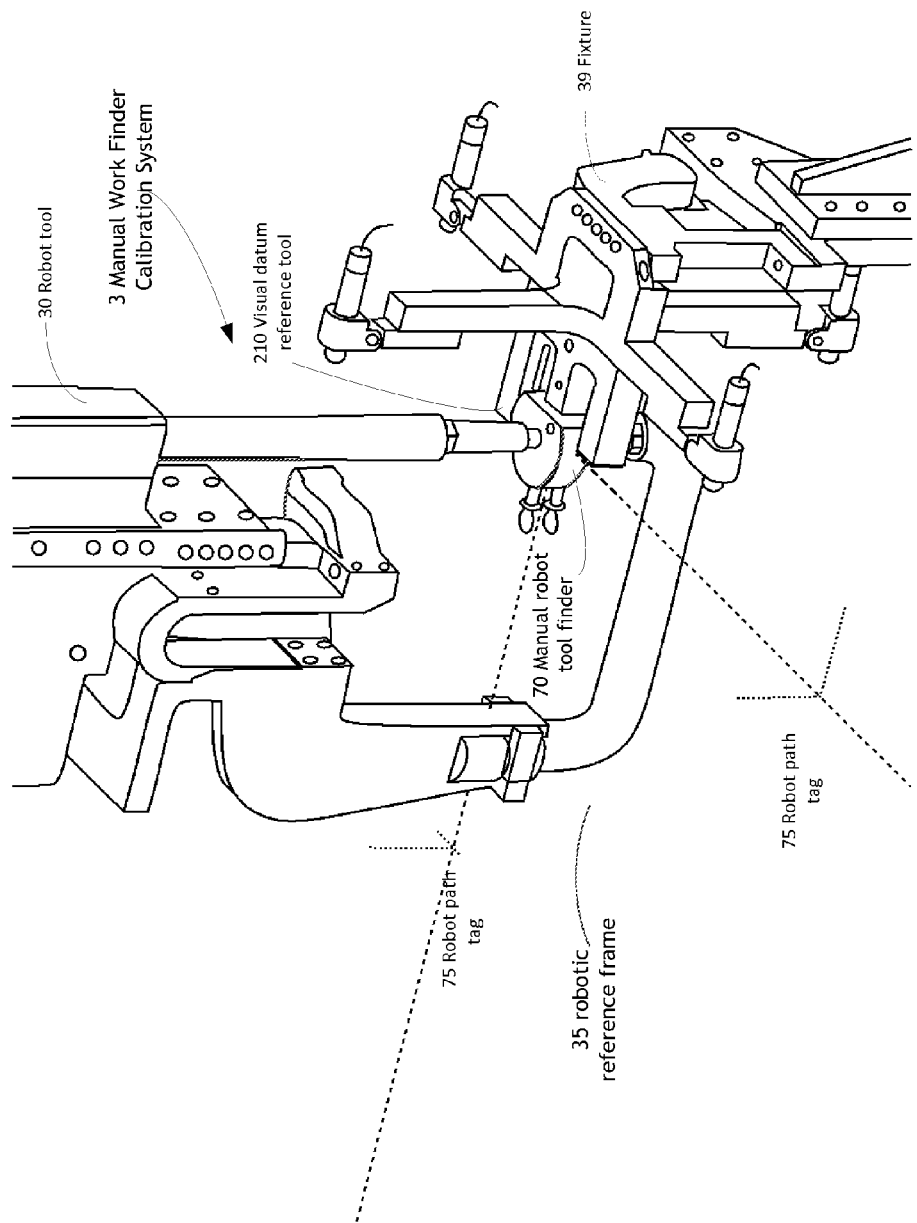
FIG. 27 depicts a perspective view of a fifth preferred embodiment of the robot calibration system of the present invention, the robot calibration system includes the visual datum reference tool of FIG. 26 mounted on a fixture, and the manual robotic tool finder of FIG. 19 is mounted on a weld gun and positioned at the tool center point of the visual datum reference tool.
Figure 28:
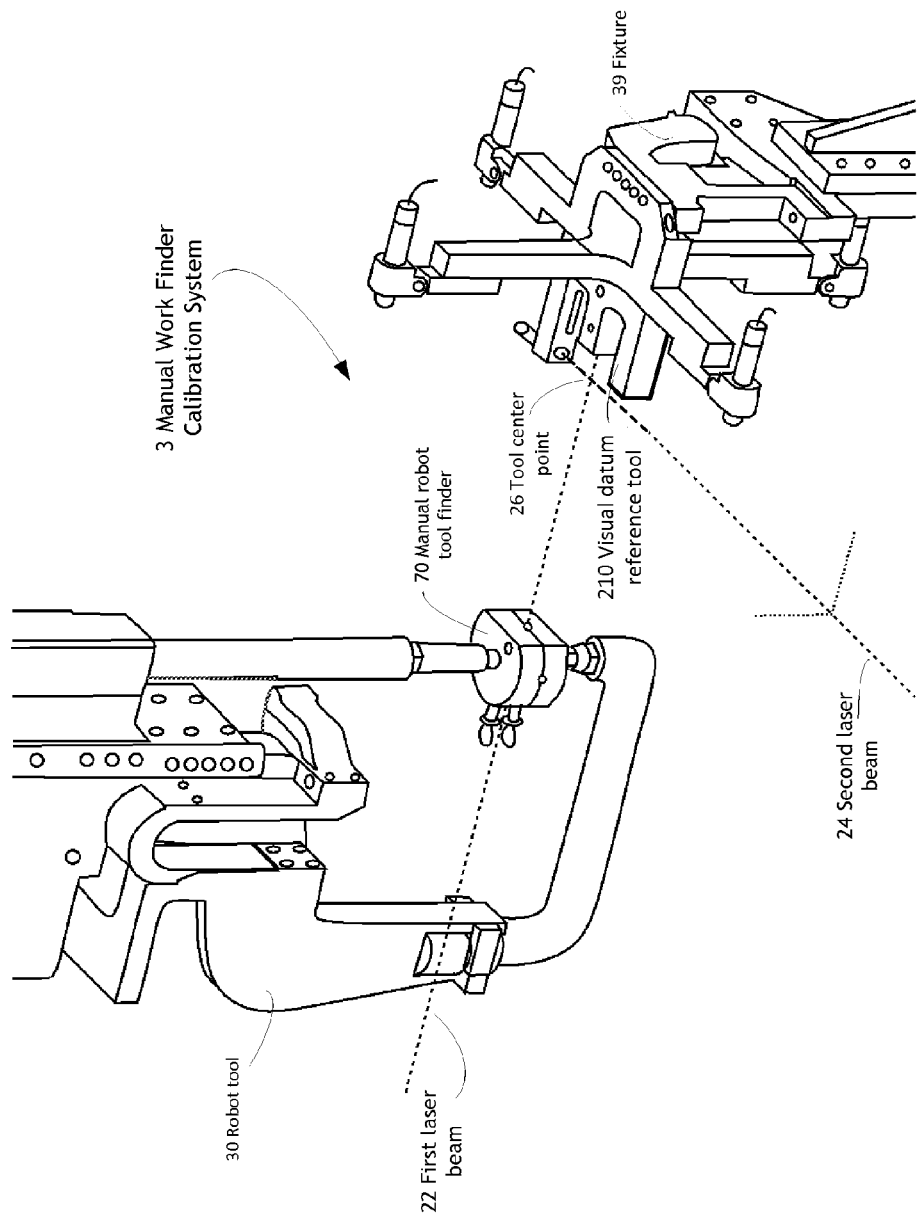
FIG. 28 depicts a second perspective view of the fifth preferred embodiment of the robot calibration system of FIG. 27, the manual robotic tool finder still being mounted onto the weld gun but being repositioned and moved downstream of the first laser beam being emitted from the visual datum reference tool, the visual datum reference tool still being mounted onto the fixture.
Figure 29:
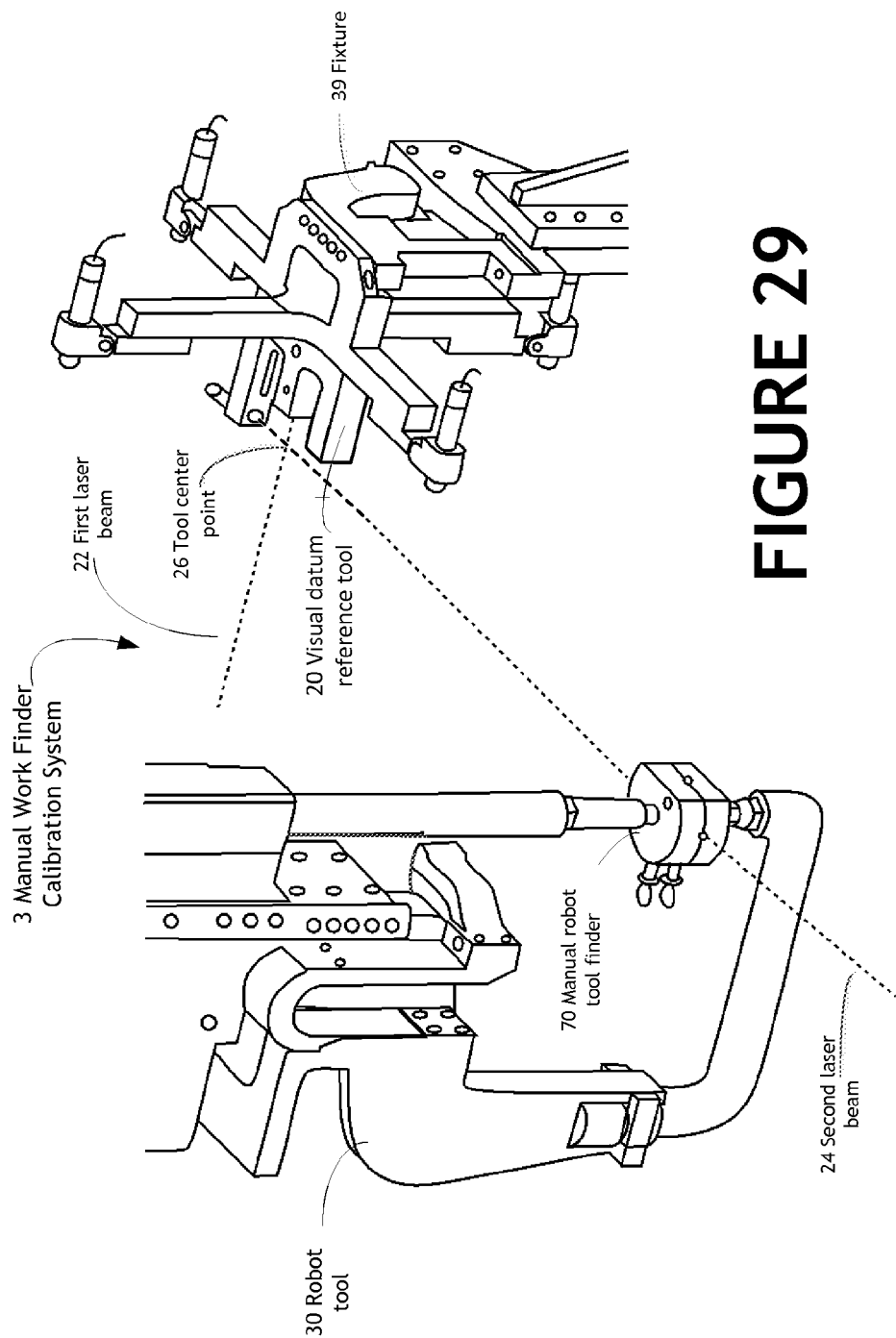
FIG. 29 depicts a third perspective view of the fifth preferred embodiment of the robot calibration system of FIG. 27, the manual robotic tool finder still being mounted onto the weld gun but being repositioned and moved downstream of the second laser beam being emitted from the visual datum reference tool, the visual datum reference tool still being mounted onto the fixture.

FIGS. 27, 28, and 29 depict the fifth preferred embodiment of the robotic calibration system [6] of the present invention. The manual robotic tool finder [70] is mounted on a robot tool [30] being used with the visual datum reference tool [20] mounted on fixture [39]. The manual robotic tool finder [70] cooperatively engages with the visual datum reference tool [20], which defines a robotic reference frame [35] (a frame in space that is relative to an industrial robot and workpiece tool) that is otherwise abstract and cannot be seen. The visual datum reference tool [210] includes two laser mounted onto a work piece or tool, at a known location with the two laser beams [22 and 24] intersecting at essentially a 90° angle and continuing to project outward. The mounting is preferably a numerical control block [46] or a NAAMS mounting pattern [47]. The tool center point [26] of the robot defines the correct location of the robotic reference frame [35]. To accomplish this, the robot will record a first point [26] at the intersection of the two laser beams (see FIG. 27). A second point [23] is then selected along the axis of the first laser beam [22] (see FIG. 28). A third point [25] is then selected along the axis of the second laser beam [24] (see FIG. 29).

Figure 30:
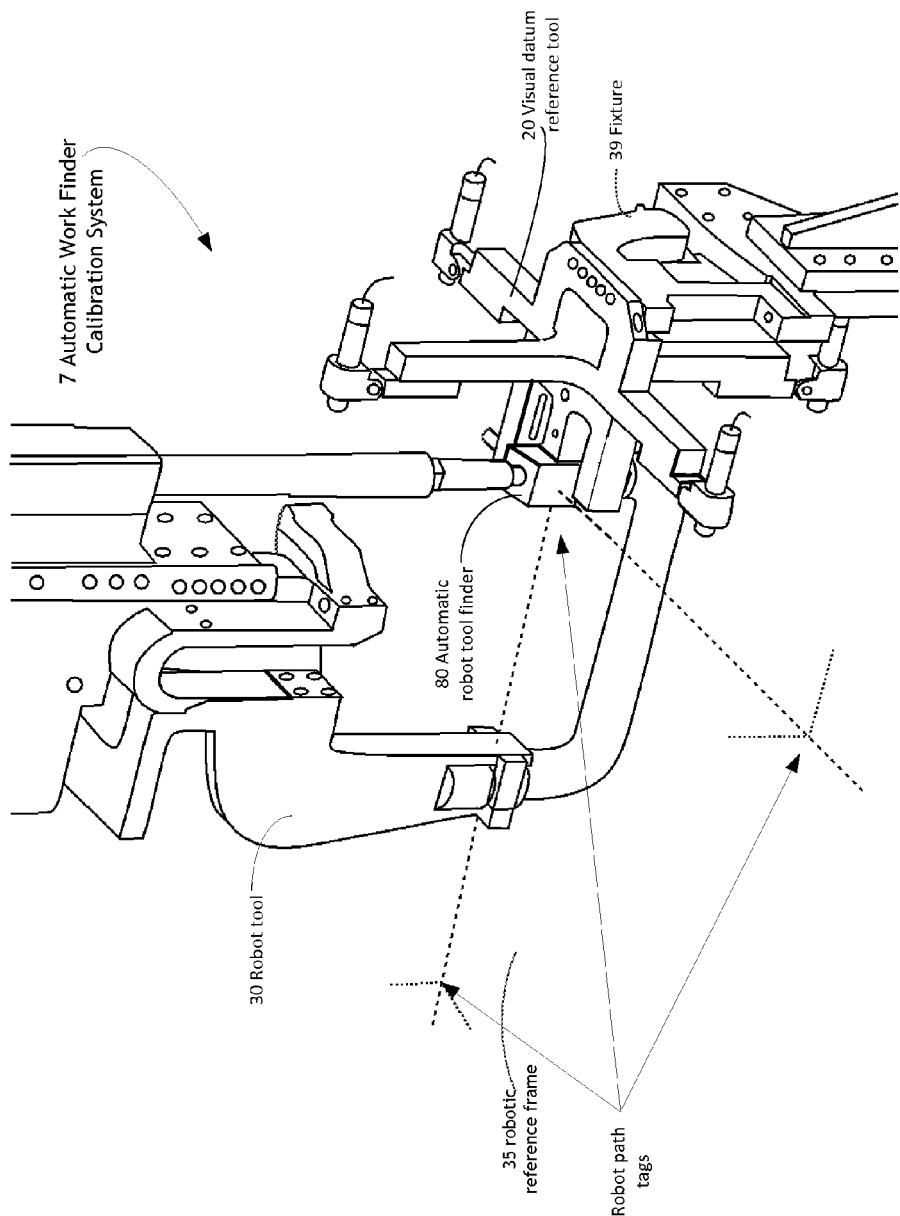
FIG. 30 depicts a perspective view of a sixth preferred embodiment of the robot calibration system of the present invention, the robot calibration system includes the visual datum reference tool of FIG. 26 mounted on a fixture, and the automatic robotic tool finder of FIG. 19 is mounted on a weld gun and positioned at the tool center point of the visual datum reference tool.
Figure 31:
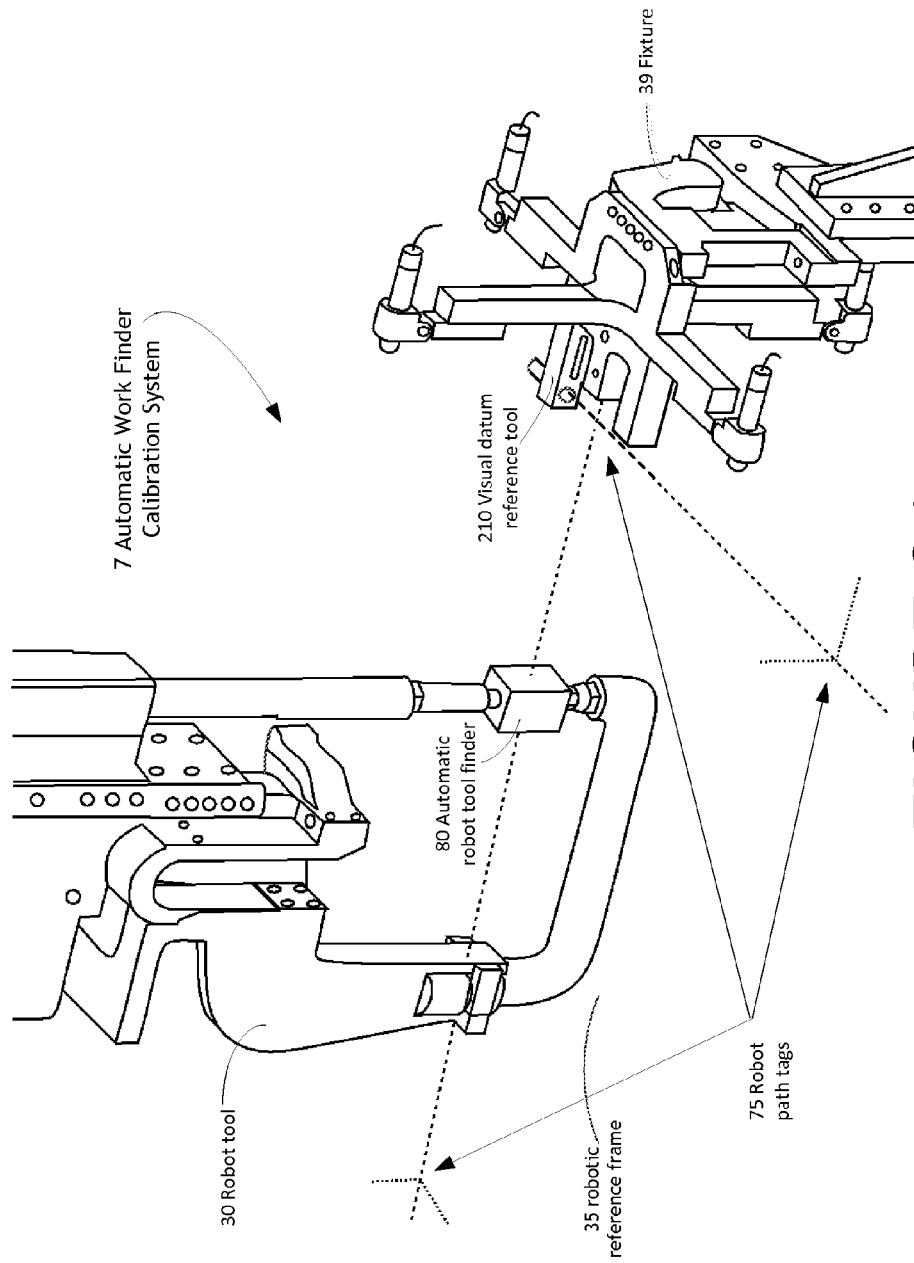
FIG. 31 depicts a second perspective view of the sixth preferred embodiment of the robot calibration system of FIG. 30, the automatic robotic tool finder still being mounted onto the weld gun but being repositioned and moved downstream of the first laser beam being emitted from the visual datum reference tool, the visual datum reference tool still being mounted onto the fixture.
Figure 32:
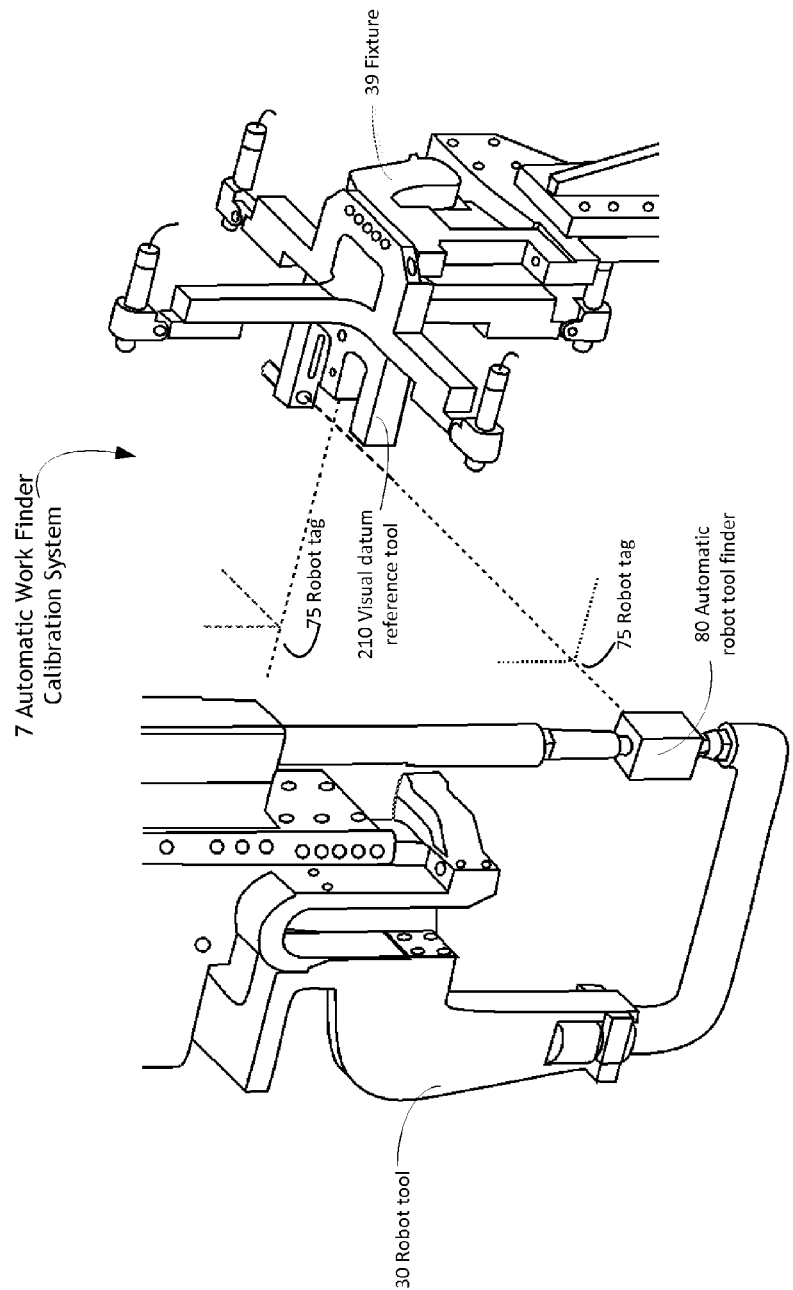
FIG. 32 depicts a third perspective view of the sixth preferred embodiment of the robot calibration system of FIG. 30, the automatic robotic tool finder still being mounted onto the weld gun but being repositioned and moved downstream of the second laser beam being emitted from the visual datum reference tool, the visual datum reference tool still being mounted onto the fixture.

FIGS. 30, 31, and 32 depict the sixth preferred embodiment of the robotic calibration system [7] of the present invention. The automatic robotic tool finder [80] is mounted on a robot tool [30] being used with the visual datum reference tool [10] mounted on fixture [39]. The automatic robotic tool finder [80] cooperatively engages with the visual datum reference tool [10], which defines a robotic reference frame [35] that is otherwise abstract and cannot be seen. The visual datum reference tool [10] includes two lasers mounted onto a work piece or tool, at a known location with the two laser beams [22 and 24] intersecting at essentially a 90° angle and continuing to project outward. The mounting is preferably a numerical control block [46] or a NAAMS mounting pattern [47]. The tool center point [26] of the robot defines the correct location of the robotic reference frame [28]. To accomplish this, the robot will record a first point [26] at the intersection of the two laser beams (see FIG. 30). A second point [23] is then selected along the axis of the first laser beam [22] (see FIG. 31). A third point [25] is then selected along the axis of the second laser beam [24] (see FIG. 32).

The robot calibration systems and methods of the present invention of the present invention as described herein are compatible with robotic simulation packages, including but not limited to, "Robcad®" which is a registered trademark of Tecnomatix Technologies Ltd., "Delmia®" which is a registered trademark of Dassault Systemes, Roboguide® which is a registered trademark of Fanuc Ltd. Corp., and "RobotStudio®" which is a registered trademark of ABB AB Corp. CAD software.

Throughout this application, various patents and applications are referenced by number and inventor. The disclosures of these patents/applications in their entireties are hereby incorporated by reference into this specification in order to more fully describe the state of the art to which this invention pertains.

It is evident that many alternatives, modifications, and variations of the robot calibration systems of the present invention of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

PARTS LIST

1. Robotic work finder calibration system ($1^{st}$ embodiment)
2. Robotic work finder calibration system ($2^{nd}$ embodiment)
3. Robotic work finder calibration system ($3^{rd}$ embodiment)
5. Robotic work finder calibration system ($4^{th}$ embodiment)
6. Robotic work finder calibration system ($5^{th}$ embodiment)
7. Robotic work finder calibration system ($6^{th}$ embodiment)
10. Visual datum reference tool ($1^{st}$ embodiment)
12. First laser
14. Second Laser
16. LEDs
17. Horizontal frame member
18. Vertical frame member
22. First laser beam
23. Second Point
24. Second laser beam
25. Third Point
25A. E-shaped structure with opening
25B. E-shaped structure with truncated arm
26. Tool center point
27A. E-shaped member arm w/laser
27B. E-shaped member arm w/opening
27C. E-shaped member truncated arm
28. Robotic datum/frame
29. Opening
30. Robot tool
32A, 32B, 32C, and 32D Frame ends
33. Frame member
34. Frame member
35. Robotic reference frame
39. Fixture
40. Visual datum reference tool
41A, 41B, 41C, and 41D. Plane-projecting lasers
46. Wedge
47. NAAMS mount
48. Robotic datum/frame
50. Robot
52. Mount
70. Manual robotic tool finder
80. Automatic robotic tool finder
110. Visual datum reference tool ($2^{nd}$ embodiment)
121. Laser beam alignment hole #1
122. Laser beam alignment hole #2
123. Upper jaw
124. Upper jaw laser beam alignment passageway #1
126. Upper jaw laser beam alignment passageway #2
133. Lower jaw
134. Lower jaw laser beam alignment passageway #1
136. Lower jaw laser beam alignment passageway #2
210. Visual datum reference tool ($3^{rd}$ embodiment)

I claim:

1. A robot calibration system comprising:
   a. a visual datum reference tool, having a first and second lasers, said first laser emitting a first laser beam, said second laser emitting a second laser beam, said first laser beam intersecting said second laser beam at a tool center point, said tool center point defining the location of a robotic reference frame; and
   b. a robotic tool finder being disposed onto a robot tool, said robotic tool finder enabling generation of said robotic reference frame, said robotic reference frame enabling calibration of said robot work path;
   whereby angular positions of said robot tool are adjustable relative to said robotic reference frame.

2. The robot calibration system of claim 1, wherein said robotic reference frame is defined by a first point disposed at said tool center point, a second point disposed along said first laser beam other than at said tool center point, and a third point disposed along said second laser beam other than said tool center point.

3. The robot calibration system of claim 1, wherein said robotic tool finder is a manual tool finder, said manual tool finder, in use, enables user alignment of said robot work path by moving said robot into until said first or second laser is visible through either said first passageway or said second passageway unobstructed.

4. The robot calibration system of claim 1, wherein said robotic tool finder is a manual robot tool finder having a first passageway and a second passageway, said first passageway intersecting said second passageway, and mounting means for retaining said manual robot tool finder onto a robot tool, said manual robot tool finder, in use, moving said robot tool until said first or second laser of said visual datum reference tool is unobstructed either through said first passageway or through said second passageway enabling alignment of said robot work path.

5. The robot calibration system of claim 3, wherein said robotic tool finder is a manual robot tool finder having:
   a. a first passageway enabling a first laser beam to pass therethrough unobstructed;
   b. a second passageway enabling a second laser beam to pass therethrough unobstructed, said second passageway intersecting said first passageway; and
   c. mounting means for retaining said manual tool finder onto a robot tool;
   whereby said manual tool finder includes a closed position and an open position, said open position enabling access to said first and said second passageways.

6. The robot calibration system of claim 1, wherein said robotic tool finder is an automatic tool finder having mounting means for retaining said calibration device onto a robot tool; said automatic tool finder having a plurality of LEDs mounted thereon, said plurality of LEDs being in close prose proximity to each other, an LED being illuminated when struck by said first or second laser beam.

7. The robot calibration system of claim 1, wherein said robotic tool finder is an automatic tool finder mounting means for retaining said calibration device onto a robot tool; and a plurality of LEDs mounted thereon, said plurality of LEDs in close prose proximity to each other, each of said LEDs being illuminated when struck by a laser; whereby said automatic tool finder, in use, when attached to said robot tool, automatically programs a robot work path when said LEDs contact either said first or said second laser beam.

8. A robot calibration system comprising:
   a. a visual datum reference tool, having a first and second lasers, said first laser emitting a first laser beam, said second laser emitting a second laser beam, said first laser beam intersecting said second laser beam at a tool center point, said tool center point defining the location of a robotic reference frame; and
   b. means for adjusting angular positions of said robot tool relative to said robotic reference frame, said adjusting means being disposed relative to a robot tool, said adjusting means enabling generation of said robotic reference frame;
   whereby angular positions of said robot tool are adjustable relative to said robotic reference frame.

9. The robot calibration system of claim 8, wherein said adjusting means is a manual tool finder, said manual tool finder, in use, enables user alignment of said robot work path by moving said robot into until said first or second laser is visible through either said first passageway or said second passageway unobstructed.

10. The robot calibration system of claim 8, wherein said adjusting means is a manual robot tool finder having a first passageway and a second passageway, said first passageway intersecting said second passageway, and mounting means for retaining said manual robot tool finder onto a robot tool, said manual robot tool finder, in use, moving said robot tool until said first or second laser of said visual datum reference tool is unobstructed either through said first passageway or through said second passageway enabling alignment of said robot work path.

11. The robot calibration system of claim 8, wherein said adjusting means is a manual robot tool finder having:
   a. a first passageway enabling a first laser beam to pass therethrough unobstructed;
   b. a second passageway enabling a second laser beam to pass therethrough unobstructed, said second passageway intersecting said first passageway; and
   c. mounting means for retaining said manual tool finder onto a robot tool;
   whereby said robot calibration device includes a closed position and an open position, said open position enabling access to said first and said second passageways.

12. The robot calibration system of claim 8, wherein said adjusting means is an automatic tool finder having mounting means for retaining said calibration device onto a robot tool; said automatic tool finder having a plurality of LEDs mounted thereon, said plurality of LEDs being in close prose proximity to each other, an LED being illuminated when struck by said first or second laser beam.

13. The robot calibration system of claim 8, wherein said adjusting means is an automatic tool finder mounting means for retaining said calibration device onto a robot tool; and a plurality of LEDs mounted thereon, said plurality of LEDs in close prose proximity to each other, each of said LEDs being illuminated when struck by a laser; whereby said automatic tool finder, in use, when attached to said robot tool, automatically programs a robot work path when said LEDs contact either said first or said second laser beam.

14. A robot calibration system comprising:
   a. means for emitting a first and second lasers, said first laser emitting a first laser beam, said second laser emitting a second laser beam, said first laser beam intersecting said second laser beam at a tool center point, said first laser and said first laser beam defining the location of a robotic reference frame; and
   b. means for adjusting angular positions of said robot tool relative to said robotic reference frame, said adjusting means being disposed relative to a robot tool, said adjusting means enabling generation of said robotic reference frame;
   whereby angular positions of said robot tool are adjustable relative to said robotic reference frame.

15. The robot calibration system of claim 14, wherein said robotic reference frame is defined by a first point disposed at said tool center point, a second point disposed along said first laser beam other than at said tool center point, and a third point disposed along said second laser beam other than said tool center point.

16. The robot calibration system of claim 14, wherein said adjusting means is a manual tool finder, said manual tool finder, in use, enables user alignment of said robot work path by moving said robot into until said first or second laser is visible through either said first passageway or said second passageway unobstructed.

17. The robot calibration system of claim 14, wherein said adjusting means is a manual robot tool finder having a first passageway and a second passageway, said first passageway intersecting said second passageway, and mounting means for retaining said manual robot tool finder onto a robot tool, said manual robot tool finder, in use, moving said robot tool until said first or second laser of said emitting means is unobstructed either through said first passageway or through said second passageway enabling alignment of said robot work path.

18. The robot calibration system of claim 14, wherein said adjusting means is a manual robot tool finder having:

a. a first passageway enabling a first laser beam to pass therethrough unobstructed;

b. a second passageway enabling a second laser beam to pass therethrough unobstructed, said second passageway intersecting said first passageway; and c. mounting means for retaining said manual tool finder onto a robot tool;

whereby said robot calibration device includes a closed position and an open position, said open position enabling access to said first and said second passageways.

19. The robot calibration system of claim 14, wherein said adjusting means is an automatic tool finder having mounting means for retaining said calibration device onto a robot tool; said automatic tool finder having a plurality of LEDs mounted thereon, said plurality of LEDs being in close prose proximity to each other, an LED being illuminated when struck by said first or second laser beam.

20. The robot calibration system of claim 14, wherein said adjusting means is an automatic tool finder mounting means for retaining said calibration device onto a robot tool; and a plurality of LEDs mounted thereon, said plurality of LEDs in close prose proximity to each other, each of said LEDs being illuminated when struck by a laser; whereby said automatic tool finder, in use, when attached to said robot tool, automatically programs a robot work path when said LEDs contact either said first or said second laser beam.

* * * * *